United States Patent
Miyata

(10) Patent No.: US 8,335,472 B2
(45) Date of Patent: Dec. 18, 2012

(54) MOBILE COMMUNICATION TERMINAL, MOBILE COMMUNICATION SYSTEM, MOBILE COMMUNICATION METHOD AND RECORDING MEDIUM

(75) Inventor: Katsuya Miyata, Yokohama (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 350 days.

(21) Appl. No.: 12/723,046

(22) Filed: Mar. 12, 2010

(65) Prior Publication Data
US 2010/0234001 A1  Sep. 16, 2010

(30) Foreign Application Priority Data
Mar. 16, 2009  (JP) .................................. 2009-063654

(51) Int. Cl.
*H04B 7/00*  (2006.01)
(52) U.S. Cl. ............... 455/41.2; 455/41.3; 455/41.4; 455/418; 455/419; 455/420; 455/422.1
(58) Field of Classification Search ............... 455/41.2, 455/41.3, 41.4, 418, 419, 420, 422.1
See application file for complete search history.

(56) References Cited

U.S. PATENT DOCUMENTS

| | | | |
|---|---|---|---|
| 6,865,371 B2 * | 3/2005 | Salonidis et al. | 455/41.1 |
| 7,031,945 B1 * | 4/2006 | Donner | 705/64 |
| 7,924,149 B2 * | 4/2011 | Mendelson | 340/539.11 |
| 7,970,350 B2 * | 6/2011 | Sheynman et al. | 455/41.1 |
| 7,975,051 B2 * | 7/2011 | Saint Clair et al. | 709/225 |
| 8,102,797 B2 * | 1/2012 | Abel | 370/328 |
| 8,160,495 B2 * | 4/2012 | Khedouri et al. | 455/41.2 |
| 2008/0182512 A1 * | 7/2008 | Waters | 455/41.1 |
| 2008/0287060 A1 * | 11/2008 | Ramsten et al. | 455/41.1 |
| 2010/0081375 A1 * | 4/2010 | Rosenblatt et al. | 455/41.1 |
| 2011/0121950 A1 * | 5/2011 | Izadi et al. | 340/10.5 |
| 2011/0270680 A1 * | 11/2011 | Lim | 705/14.58 |
| 2011/0300802 A1 * | 12/2011 | Proctor et al. | 455/41.2 |

FOREIGN PATENT DOCUMENTS

| | | |
|---|---|---|
| JP | 2004-151750 | 5/2004 |
| JP | 2006-115299 | 4/2006 |
| JP | 2008-154004 | 7/2008 |
| JP | 2009-505562 | 2/2009 |
| WO | WO 2007/021316 A1 | 2/2007 |

OTHER PUBLICATIONS

"15 companies established consortiums for "TransferJet" of Sony", Nikkei Electronics, Nikkei BP Publishing, pp. 12-13, Aug. 11, 2008.

* cited by examiner

*Primary Examiner* — Temica M Beamer
(74) *Attorney, Agent, or Firm* — Cozen O'Connor

(57) ABSTRACT

A mobile communication terminal includes a proximity wireless communication unit and a control command generating unit. The proximity wireless communication unit performs wireless communication directly with another mobile communication terminal present in a communicationable range. When the proximity wireless communication unit is capable of communicating with another mobile communication terminal, the control command generating unit generates a control command which is associated with an internal state and which is for controlling another mobile communication terminal, and transmits the control command to another mobile communication terminal through the proximity wireless communication unit.

16 Claims, 13 Drawing Sheets

FIG. 3

| index | INTERNAL STATE | CONTROL COMMAND KIND | LOCAL TERMINAL OPERATION | PARAMETER |
|---|---|---|---|---|
| 1 | WATCHING TERRESTRIAL BROADCASTING | LAUNCH TV APPLICATION | - | TV KIND, Ch NUMBER, PROGRAM NAME |
| 2 | WEB BROWSING | LAUNCH BROWSER | - | URL |
| 3 | AFTER IMAGE PICKUP | LAUNCH IMAGE VIEWER | - | IMAGE SIZE, IMAGE DATA, IMAGE ATTRIBUTE INFORMATION |
| 4 | AFTER MOTION IMAGE PICKUP | LAUNCH MOTION IMAGE PLAYER | - | MOTION IMAGE SIZE, MOTION IMAGE DATA, MOTION IMAGE ATTRIBUTE INFORMATION |
| 5 | DISPLAYING IMAGE | LAUNCH IMAGE VIEWER | - | IMAGE SIZE, IMAGE DATA, IMAGE ATTRIBUTE INFORMATION |
| 6 | PLAYING MOTION IMAGE | LAUNCH MOTION IMAGE PLAYER | - | MOTION IMAGE SIZE, MOTION IMAGE DATA, MOTION IMAGE ATTRIBUTE INFORMATION |
| 7 | PLAYING MUSIC (DL) | LAUNCH BROWSER | - | URL |
| 8 | PLAYING MUSIC (FREE) | LAUNCH MUSIC PLAYER | - | FILE SIZE, MUSIC DATA, FILE ATTRIBUTE INFORMATION |
| 9 | GAMING (DL) | LAUNCH BROWSER | - | URL |
| 10 | GAMING (FREE) | LAUNCH GAME | - | FILE SIZE, GAME DATA, FILE ATTRIBUTE INFORMATION |
| 11 | BASIC SETTINGS | LAUNCH BASIC SETTING PROCESS | - | NUMBER OF SETTINGS, SETTING ITEM, SETTING VALUE |
| 12 | CALLING | DIALING | - | NUMBER OF CHARACTERS, PHONE NUMBER |
| 13 | RECEIVING INCOMING CALL | ACQUIRE PHONE NUMBER | TRANSFER INCOMING CALL | NUMBER OF (RESPONSE) CHARACTERS, PHONE NUMBER |
| 14 | READING MAIL | ACQUIRE MAIL ADDRESS | TRANSFER MAIL | NUMBER OF (RESPONSE) CHARACTERS, MAIL ADDRESS |
| : | : | : | : | : |

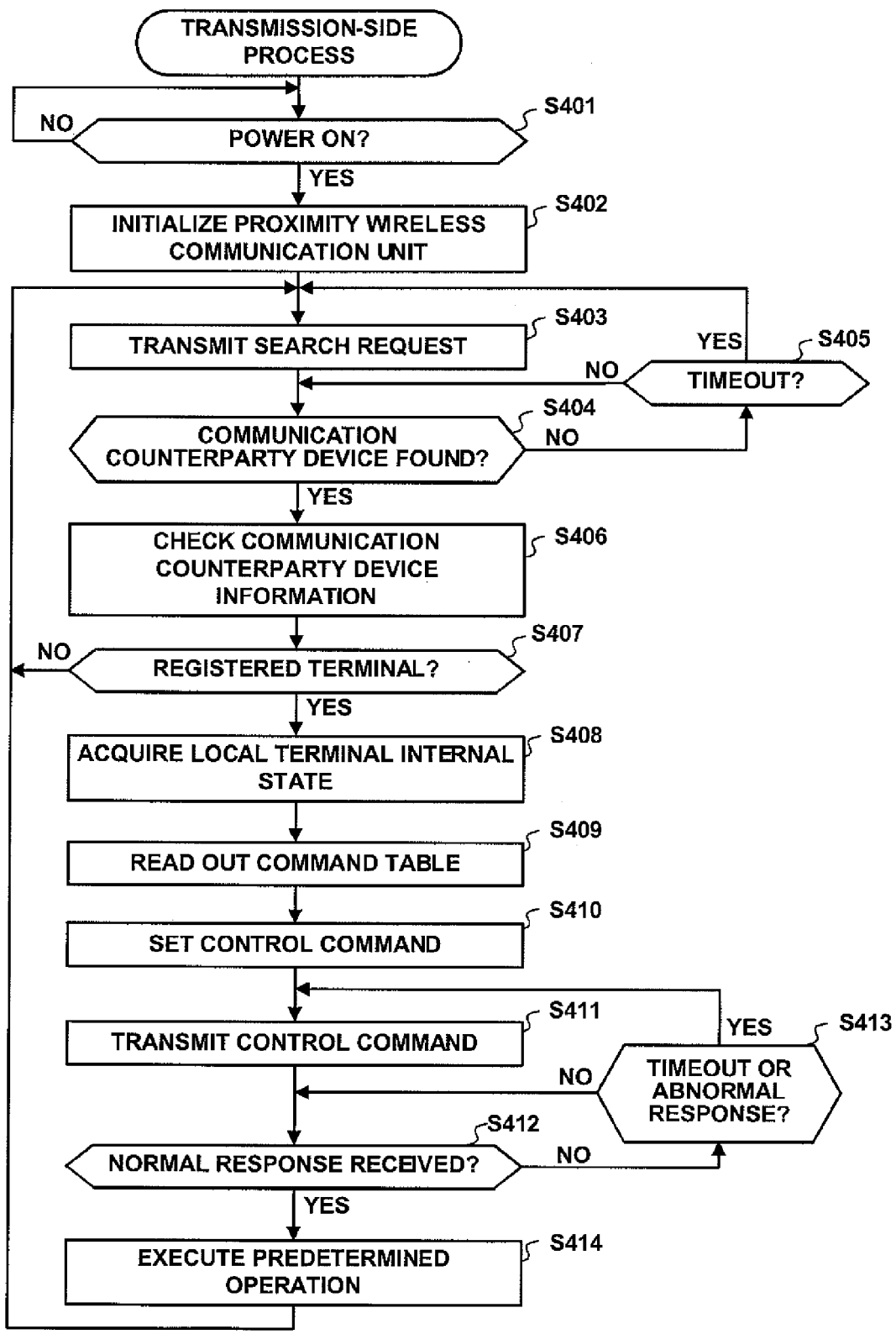

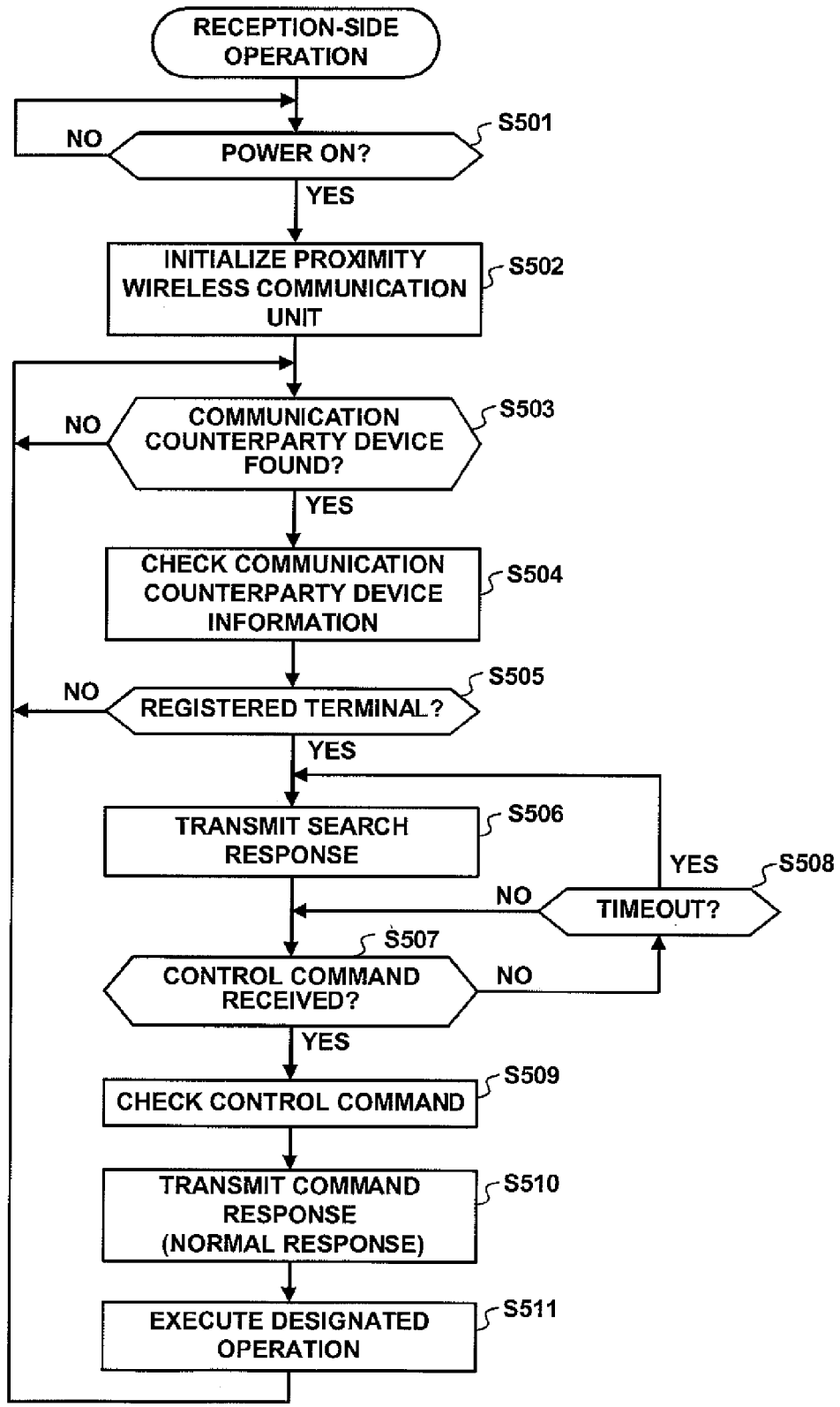

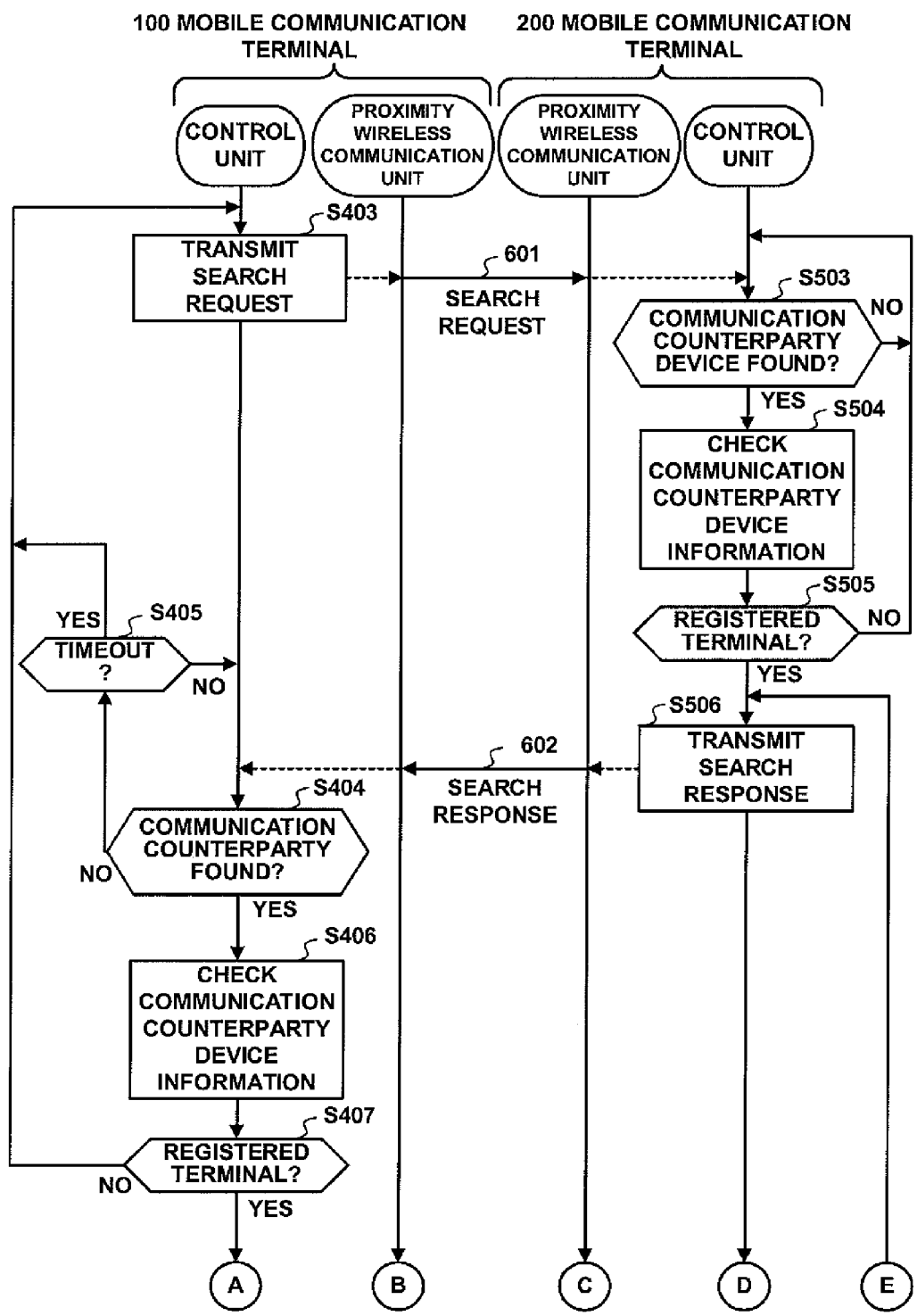

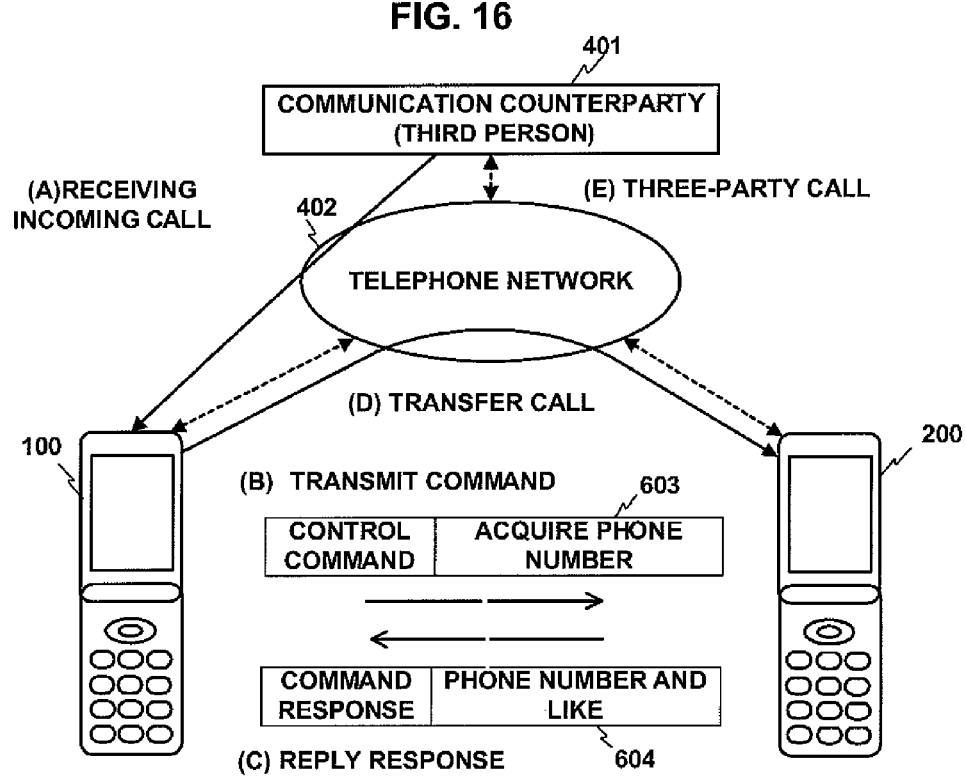
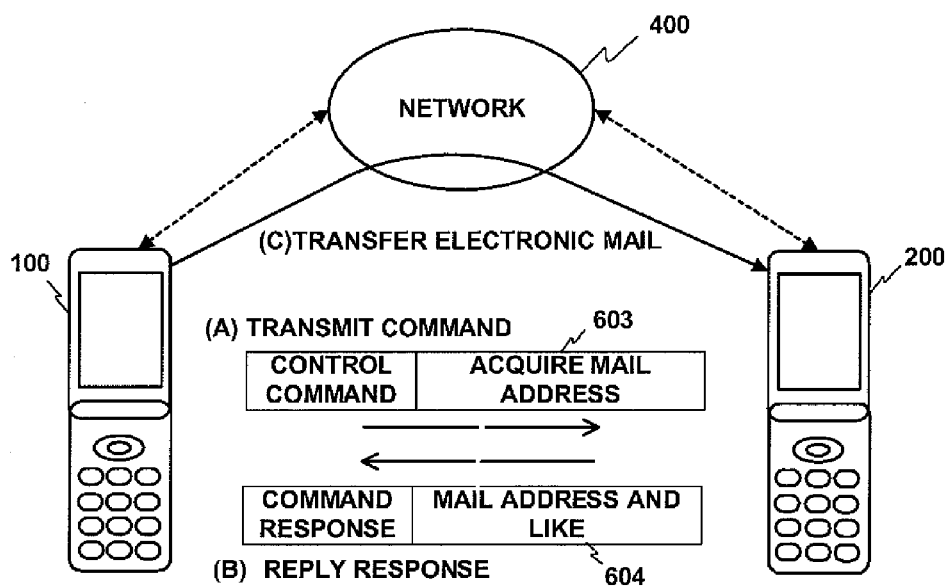

MOBILE COMMUNICATION TERMINAL, MOBILE COMMUNICATION SYSTEM, MOBILE COMMUNICATION METHOD AND RECORDING MEDIUM

CROSS-REFERENCE TO RELATED APPLICATION

This application claims the benefit of Japanese Patent Application No. 2009-063654, filed on Mar. 16, 2009, the entire disclosure of which is incorporated by reference herein.

FIELD

The present invention relates to a mobile communication terminal, a mobile communication system, a mobile communication method, and a recording medium, and more specifically, a mobile communication terminal having a proximity wireless communication function of directly communicating with another terminal in a close range, a mobile communication system having such a mobile communication terminal, a mobile communication method, and a recording medium.

BACKGROUND

Recently, cellular phones equipped with a non-contact type IC card are in practical use. There is also a system in practical use which carries out settlement of a purchased merchandise as a non-contact communication is carried out between such a cellular phone and a ticket gate, an automatic vending machine, and the like (see, for example, Unexamined Japanese Patent Application KOKAI Publication No. 2004-151750).

There is proposed a scheme of exchanging address book information between cellular phones using a close-range communication function or a non-contact communication function (see, for example, Unexamined Japanese Patent Application KOKAI Publication No. 2008-154004).

Furthermore, there is developed a proximity wireless transfer technology which performs a high-speed communication in a close range that a communication distance is 3 cm or so (see, for example, "15 companies established consortiums for "TransferJet" of SONY", Nikkei Electronics, Aug. 11, 2008, NIKKEI BP Publishing, P. 12 to 13). Data of large amount of contents can be exchanged in a short time according to this proximity wireless transfer technology.

When the non-contact communication function or the proximity wireless communication function disclosed in Unexamined Japanese Patent Application KOKAI Publication No. 2004-151750 or Unexamined Japanese Patent Application KOKAI Publication No. 2008-154004 is used, it is necessary for a user to operate keys of a mobile communication terminal and to select data to be transmitted or an application to be used. Such user operation is, however, extremely bothersome to the user.

When a user wants to watch a terrestrial digital broadcasting program that another user receives and plays using his/her own mobile communication terminal through a terminal device, it is necessary for the user to get the channel of the watched program from another user, and to tune a channel through a user operation by himself/herself. Such successive operations are also extremely bothersome to the user.

Likewise, when a user wants to view, through his/her own terminal, a website that another user is browsing, it is necessary for the user to get the URL of the browsed website, and to access such a website through a user operation by himself/herself. Such successive operations are also bothersome to the user.

SUMMARY

The present invention has been made in view of the foregoing circumstances, and provides a mobile communication terminal, a mobile communication system, a mobile communication method, and a recording medium which enable controlling, through one terminal, of an operation of another terminal as those terminals are moved close to each other in a communicationable distance.

A mobile communication terminal according to a first aspect of the present invention comprises: a proximity wireless communication unit that performs wireless communication directly with another mobile communication terminal present in a communicationable range; and a control command generating unit that generates a control command which is for controlling another mobile communication terminal and which is associated with an internal state of the mobile communication terminal when the proximity wireless communication unit is capable of communicating with another mobile communication terminal, and transmits the control command to another mobile communication terminal through the proximity wireless communication unit.

In this case, the mobile communication terminal may further comprise an application executing unit which executes an application, and the internal state may change in accordance with an operating state of the application executing unit.

The control command generating unit may add additional information on executing of an application by the application executing unit to the control command including an instruction of activating a specific application executing unit, and may transmit the control command together with the additional information.

The control command generating unit may generate, as the additional information, information for specifying a transmission originator of data to be used by the application executing unit.

When the application executing unit is a broadcast receiving/playing unit which receives broadcast airwaves and plays broadcast programs, the additional information may contain information for specifying a broadcasting originator of a program received and played by the broadcast receiving/playing unit, when the application executing unit is a browser executing unit which accesses a website and displays the website, the additional information may contain information for specifying the website displayed by the browser executing unit, when the application executing unit is a music playing unit which plays music, the additional information may contain information for specifying a website from which music data can be downloaded, and when the application executing unit is a game executing unit which executes a game, the additional information may contain information for specifying a website from which game data can be downloaded.

The control command generating unit may generate, as the additional information, data to be used by the application executing unit.

When the application executing unit is either one of an image pickup unit which picks up a still image or a motion image and a display unit which displays the still image or the motion image, the additional information may contain image data of the still image or the motion image, when the application executing unit is a music playing unit which plays music, the additional information may contain music data, when the application executing unit is a game executing unit which executes a game, the additional information may contain game data, when the application executing unit is a setting unit which sets an internal parameter, the additional information may contain the internal parameter, and when the application executing unit is a telephone communication unit which performs telephone communication, the additional information may contain a phone number of a communication counterparty currently in a state of calling.

The mobile communication terminal may further comprise an operation control unit which controls an operation of the application executing unit based on a content of a response to the control command transmitted by the control command generating unit.

The application executing unit may be a telephone communication unit which performs telephone communication, the control command generating unit may transmit the control command containing a notification request of a phone number when the internal state is in a state of calling through the telephone communication unit or in a state of receiving an incoming call to the telephone communication unit, and the operation control unit may control the telephone communication unit to dial a phone number of the another mobile communication terminal contained in the content of the response to the control command.

The application executing unit may be an electronic mail executing unit which transmits/receives an electronic mail, the control command generating unit may transmit the control command containing a notification request of a mail address when the internal state is in opening an electronic mail using the application executing unit, and the operation control unit may transmit the electronic mail being currently opened to the mail address of the another mobile communication terminal contained in the content of the response to the control command.

When the internal state is an idling state, the control command generating unit may generate the control command for cancelling another control command transmitted previously to the another mobile communication terminal to which the another control command is already transmitted through the proximity wireless communication unit, and may transmit the control command to the another mobile communication terminal.

When a communication through the proximity wireless communication unit is once disconnected and becomes a communicationable again, the control command generating unit may generate the control command for cancelling another control command transmitted previously and may transmit the control command to the another mobile communication terminal to which the another control command is transmitted.

The mobile communication terminal may further comprise a determination unit which searches the another mobile communication terminal through the proximity wireless communication unit and which determines whether or not the searched another mobile communication terminal is registered on a registration list, and wherein the control command generating unit may transmit the control command only to the searched another mobile communication terminal that is determined as a registered terminal on the registration list by the determination unit.

The another mobile communication terminal comprises: a proximity wireless communication unit which performs wireless communication directly with the mobile communication terminal according to the first aspect of the present invention present in a communicationable range; and an operation control unit which performs operation control in accordance with the control command received by the proximity wireless communication unit when the proximity wireless communication unit is capable of communicating with the mobile communication terminal according to claim 1.

In this case, the another mobile communication terminal may further comprise an application executing unit which executes an application, and wherein when the control command contains an instruction of activating a specific application executing unit and additional information on executing of the application executing unit is added to the control command, the operation control unit may activate an application executing unit in accordance with the activation instruction, and cause the application executing unit to operate in accordance with the additional information.

When the additional information contains information for specifying a transmission originator of data, the operation control unit may cause the application executing unit to access the transmission originator.

When the control command contains an instruction of activating a broadcast receiving/playing unit which is the application executing unit and the additional information contains information for specifying a broadcasting originator of a program, the operation control unit may activate the broadcast receiving/playing unit and may cause the broadcast receiving/playing unit to receive/play the program of the broadcasting originator specified by the additional information, when the control command contains an instruction of activating a browser executing unit which is the application executing unit and additional information contains information for specifying a website, the operation control unit may activate the browser executing unit and may cause the browser executing unit to access the website specified by the additional information and to display the website, when the control command contains an instruction of activating a music playing unit which is the application executing unit and additional information contains information for specifying a website from which music data can be downloaded, the operation control unit may activate the music playing unit and may cause the music playing unit to access the website specified by the additional information and to display the website, and when the control command contains an instruction of activating a game executing unit which is the application executing unit and additional information contains information for specifying a website from which game data can be downloaded, the operation control unit may activate the game executing unit and may cause the game executing unit to access the website specified by the additional information and to display the website.

When additional information contains data to be used by the application executing unit, the operation control unit may control the application executing unit based on the data.

When the control command contains an instruction of activating a display unit which is the application executing unit and additional information contains image data of a still image or a motion image, the operation control unit may cause the display unit to display the image data contained in the additional information, when the control command contains an instruction of activating a music playing unit which is the application executing unit and additional information contains music data, the operation control unit may cause the music playing unit to play music based on the music data contained in the additional information, when the control command contains an instruction of activating a game executing unit which is the application executing unit and additional information contains game data, the operation control unit may cause the game executing unit to execute a game based on the game data contained in the additional information, when the control command contains an instruction of activating a setting unit which is for setting an internal parameter and which is the application executing unit and additional information contains the internal parameter, the operation control unit may cause the setting unit to set the internal parameter contained in the additional information, and when the control command contains an instruction of activating a telephone communication unit which performs telephone communication and which is the application executing unit and additional information contains a phone number of a communication counterparty currently in a state of calling, the operation control unit may cause the telephone communication unit to dial the phone number contained in the additional information.

When the control command contains a transmission request of information for specifying the mobile communication terminal itself, the operation control unit may reply the information for specifying the mobile communication terminal itself.

The application executing unit may be a telephone communication unit or an electronic mail executing unit, and the information for specifying the mobile communication terminal itself may be a phone number or a mail address.

When the control command contains an instruction of cancelling a previously-transmitted control command, the operation control unit may cancel an operation being currently executed in accordance with the control command.

The another mobile communication terminal may further comprise a determination unit which searches the mobile communication terminal through the proximity wireless communication unit, and which determines whether or not the searched mobile communication terminal is registered on a registration list, and wherein the operation control unit may execute operation control in accordance with the control command transmitted from only the searched mobile communication terminal determined by the determination unit as a registered terminal on the registration list.

A mobile communication system according to a second aspect of the present invention comprises: the first mobile communication terminal according to the first aspect; and the another mobile communication terminal explained above.

A mobile communication method according to a third aspect of the present invention is executed by a mobile communication terminal including a proximity wireless communication unit and a control command generating unit, the method comprising: a proximity wireless communication step of causing the proximity wireless communication unit to perform wireless communication directly with another mobile communication terminal present in a communication-able range; and a control command generating step of causing the control command generating unit to generate a control command which is associated with an internal state of the mobile communication terminal and which is for controlling another mobile communication terminal when the proximity wireless communication unit is capable of communicating with another mobile communication terminal, and of causing the proximity wireless communication unit to transmit the control command to another mobile communication terminal.

A recording medium according to a fourth aspect of the present invention stores a program that allows a computer to function as: a proximity wireless communication unit which performs wireless communication directly with another mobile communication terminal present in a communication-able range; and a control command generation unit which generates a control command and transmits the control command to another mobile communication terminal through the proximity wireless communication unit when the proximity wireless communication unit is capable of communicating with another mobile communication terminal, the control command being associated with an internal state of the mobile communication terminal and being for controlling another mobile communication terminal.

EFFECT OF INVENTION

According to the present invention, through a simple operation of just moving the mobile communication terminals close to each other, another mobile communication terminal can be controlled through one mobile communication terminal. Accordingly, the usability significantly improves.

BRIEF DESCRIPTION OF THE DRAWINGS

A more complete understanding of this application can be obtained when the following detailed description is considered in conjunction with the following drawings, in which:

FIG. 3 shows an example of data structure of a command table provided in the mobile communication terminal in FIG. 2;

FIG. 4 is a flowchart showing a process of a mobile communication terminal (transmission side) according to the embodiment of the present invention;

FIG. 5 is a flowchart showing a process of a mobile communication terminal (reception side) according to the embodiment of the present invention;

FIG. 6 is a flowchart showing a (first) process of a mobile communication terminal (transmission side) and a mobile communication terminal (reception side) according to the embodiment of the present invention;

FIG. 16 is a diagram for explaining an operation in a state of receiving a call;

FIG. 17 is a diagram for explaining an operation while a mail is being read.

DETAILED DESCRIPTION

An explanation will be given of an embodiment of the present invention with reference to FIGS. 1 to 18.

(System Whole Configuration)

Figure 1:
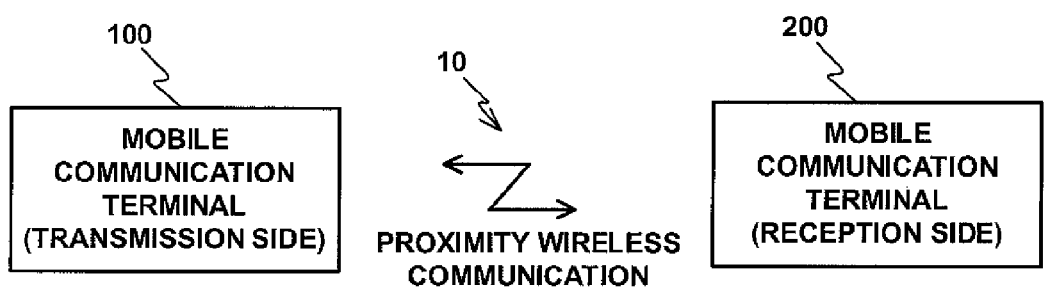
FIG. 1 is a block diagram showing a configuration of a mobile communication system according to an embodiment of the present invention.

As shown in FIG. 1, a mobile communication system 10 includes a mobile communication terminal 100 and a mobile communication terminal 200. The mobile communication terminals 100, 200 correspond to first and second mobile communication terminals, respectively.

The mobile communication terminals 100, 200 each has a proximity wireless communication function for performing proximity wireless communication with each other. When both mobile communication terminals 100, 200 are located within a communicationable range, the mobile communication terminals 100, 200 can transmit/receive data with each other using the proximity wireless communication function. Examples of the communication scheme of such a proximity wireless communication function are IEEE802.11, Bluetooth (registered trademark), an IC tag function, an infrared communication, and TransferJET (registered trademark). Note that when TransferJET is adopted as the communication scheme, a predetermined communication distance is approximately 3 cm.

The size of the communicationable range for the proximity wireless communication function is not limited to any particular one, but it is desirable that such a communicationable range should be a narrow range. It is desirable that the mobile communication terminal 100 and the mobile communication terminal 200 communicate with each other when a user of the mobile communication terminal 100 and that of the mobile communication terminal 200 have a clear intent and move both terminals 100, 200 close to each other.

Using such a proximity wireless communication function, for example, a control command for controlling an operation of the mobile communication terminal 200, and a response thereto are transmitted/received between the mobile communication terminal 100 and the mobile communication terminal 200. In FIG. 1, the mobile communication terminal 100 which transmits a control command is shown as a transmission side, while the mobile communication terminal 200 which receives the control command is shown as a reception side.

(Basic Configuration of Mobile Terminal 100)

Figure 2:
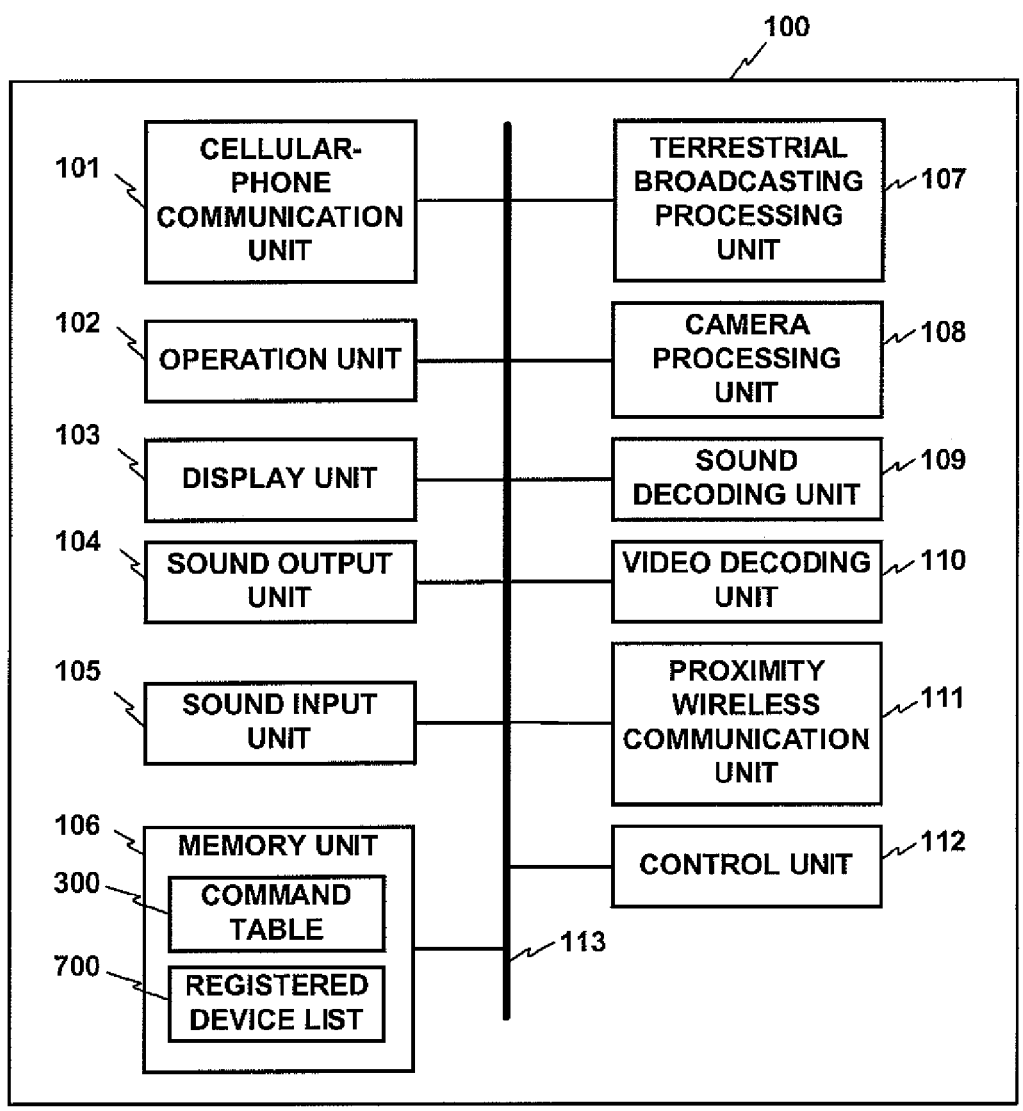
FIG. 2 is a block diagram showing functional configurations of a mobile communication terminal according to the embodiment of the present invention.

As shown in FIG. 2, the mobile communication terminal 100 comprises a cellular-phone communication unit 101, an operation unit 102, a display unit 103, a sound output unit 104, a sound input unit 105, a memory unit 106, a terrestrial-digital-broadcasting processing unit 107, a camera processing unit 108, a sound decoding unit 109, a video decoding unit 110, a proximity wireless communication unit 111, a control unit 112, and a bus 113.

The cellular-phone communication unit 101 transmits/receives a call sound and various data through a non-illustrated wireless communication base station under the control of the control unit 112. The cellular-phone communication unit 101 communicates with another cellular phone based on a wide-area wireless communication scheme, such as W-CDMA (Wideband Code Division Multiple Access), EV-DO (Evolution Data Only), WiMAX (Worldwide Interoperability for Microwave Access), and LTE (Long Term Evolution). The cellular-phone communication unit 101 can hold a call from a communication counterparty, and makes a call request to a new communication counterparty while holing another call under the control of the control unit 112. Moreover, the cellular-phone communication unit 101 can establish a communication among three persons (a so-called three-party call).

The operation unit 102 includes a keyboard, and various keys, such as a cursor key and numeric keys. The operation unit 102 receives operational input by the user and outputs an operation signal corresponding to the operational input to the control unit 112.

The display unit 103 comprises a display panel like a dot-matrix-type liquid crystal display (LCD), a driver circuit for driving the display panel, and the like. The display unit 103 displays an arbitrary image (e.g., a character, a still image, and a motion image) under the control of the control unit 112.

The sound output unit 104 includes, a speaker, a DAC (Digital Analog Converter), and the like. The sound output unit 104 performs D/A conversion on a sound signal input from the cellular-phone communication unit 101, and outputs a sound corresponding to the sound signal having undergone D/A conversion from the speaker. The sound output unit 104 also performs D/A conversion on, for example, a sound signal of a content decoded by the sound decoding unit 109, and outputs a sound corresponding to the sound signal having undergone D/A conversion from the speaker.

The sound input unit 105 includes a microphone and the like. The sound input unit 105 collects a voice sound of the user through the microphone during a call by the cellular-phone communication unit 101, converts the voice sound into a sound signal, and supplies the sound signal to the cellular-phone communication unit 101.

The memory unit 106 stores various data. The memory unit 106 may be a memory built in the mobile communication terminal 100, or a removable external memory. An example of various data stored in the memory unit 106 is an operation control program run by the control unit 112. In addition, the memory unit 106 stores a command table 300 and a registered device list 700. The command table 300 and the registered device list 700 will be discussed later in detail.

The terrestrial-digital-broadcasting processing unit 107 receives airwaves like One Seg through a non-illustrated antenna, and demodulate, descrambles, and demuxes the signals carried on the airwaves under the control of the control unit 112. The terrestrial-digital-broadcasting processing unit 107 provides encoded contents data acquired through the foregoing processes to the sound decoding unit 109 and the video decoding unit 110.

The camera processing unit 108 includes an image-pickup device, an image processing device, and the like. The camera processing unit 108 picks up an image under the control of the control unit 112, and acquires data on a still image or on a motion image.

The sound decoding unit 109 decodes encoded sound data. The video decoding unit 110 decodes encoded video data.

The proximity wireless communication unit 111 communicates with another mobile communication terminal 200 present in a communicationable range in accordance with the communication scheme, such as IEEE802.11, Bluetooth (registered trademark), an infrared communication, an IC tag function, or TransferJET (registered trademark), as explained above. The proximity wireless communication unit 111 directly communicates with another mobile communication terminal 200 under the control of the control unit 112 without a base station or an access point intervening.

The control unit 112 comprises a microprocessor unit including a CPU, a memory, a timer, and the like. The operation control program stored in the memory unit 106 is loaded in the memory of the control unit 112, and as the CPU runs the operation control program, the control unit 112 controls the whole operation of the mobile communication terminal 100.

Examples of the basic operation controlled by the control unit 112 are call request, incoming-call response, and a voice communication operations (telephone communication operation) using the cellular-phone communication unit 101, the sound output unit 104, and the sound input unit 105. In addition, a receiving/playing operation of a terrestrial digital broadcasting using the terrestrial-digital-broadcasting processing unit 107, the sound decoding unit 109, and the video decoding unit 110, and a browser executing operation using the cellular-phone communication unit 101 and the display unit 103 are also subjected to the control by the control unit 112. Furthermore, an image-pickup operation using the camera processing unit 108, an image display operation using the display unit 103, a music playing operation using the sound decoding unit 109 and the sound output unit 104, and a game executing operation using the sound decoding unit 109, the video decoding unit 110, the display unit 103, and the sound output unit 104 are also subjected to the control by the control unit 112.

The operation control program run by the control unit 112 is a collection of a plurality of application softwares (hereinafter, "application") individually executing each operation. For example, when the user operates the operation unit 102 to make a phone call, a signal to that effect is output to the control unit 112. The control unit 112 launches and executes an application for a voice communication operation. The call request, incoming-call response, and voice communication operations are executed in this way. That is, in accordance with an operation signal input from the operation unit 102, the control unit 112 launches an application corresponding to an operation to be executed, and executes such application, thereby controlling the whole operation of the mobile communication terminal 100. Accordingly, various functions of the mobile communication terminal 100 are realized.

Note that the control unit 112 manages the internal state of the mobile communication terminal 100. The internal state of the mobile communication terminal 100 is indicated by an internal parameter indicating a state of the mobile communication terminal 100. For example, when an application for a voice communication operation is launched and the mobile communication terminal 100 is in voice communication, the internal state of the mobile communication terminal 100 becomes "in communication".

The internal state of the mobile communication terminal 100 changes in accordance with an operational state of an application, such that which application is launched and in what execution state such an application is. For example, when watching of a terrestrial digital broadcasting is completed, an application for terrestrial digital broadcasting is terminated, an application for a browser function is launched, and access is made to a predetermined website using such an application, the internal state of the mobile communication terminal 100 changes from "in a state of watching terrestrial digital broadcasting program" to "in a state of Web browsing".

Applications defined in the embodiment also include an operation control program which does not utilize the proximity wireless communication unit 111. For example, operation control programs for a receiving/playing operation, an image-pickup operation of a still image or a motion image, and a voice communication operation are also included.

The bus 113 transfers data among the foregoing units one another. A coordinated operation by each unit and a control operation for each unit by the control unit 112 are realized through the bus 113.

(Command Table)

As shown in FIG. 3, items of the command table 300 include an internal state 301, a control command kind 302, a local terminal operation 303, and a parameter 304. In the command table 300, a set of internal state 301, control command kind 302, local terminal operation 303, and parameter 304 is registered in association with one another for each index.

In the item of the internal state 301, the internal state of the mobile communication terminal 100 is registered. For example, in the internal state 301 of the Index 1, "in a state of watching terrestrial digital broadcasting program" is registered. In the internal states 301 of the Index 2 to Index 14, "in a state of Web browsing", "after image pickup", "after motion image pickup", "in a state of displaying image", "in a state of playing motion image", "in a state of playing music (download (DL))", "in a state of playing music (free soft (free))", "in a state of playing game (DL)", "in a state of playing game (free)", "in a state of setting basic settings", "in a state of calling", "in a state of receiving call", and "in a state of reading mail" are registered, respectively. Note that "after image pickup" and "after motion image pickup" mean "within a predetermined time after an image has been picked up" and "within a predetermined time after a motion image has been picked up", respectively. In this fashion, a combination of an application executed in past, the kind of execution state thereof and other information can be set as the internal state of the mobile communication terminal 100.

In the control command kind 302, a kind of a control command to be transmitted through the proximity wireless communication unit 111 is registered in association with the internal state of the mobile communication terminal 100. For example, in the control command kind 302 of the Index 1 that the internal state 301 is "in a state of watching terrestrial digital broadcasting program", "launch TV application" is registered. Moreover, in the control command kind 302 of the Index 2 that the internal state 301 is "in a state of Web browsing", "launch browser" is registered.

The control command is an instruction to the mobile communication terminal 200, and is mainly an instruction to launch an application. Examples of the application of the mobile communication terminal 200 to be launched are an operation control program for a broadcast receiving/playing operation (TV application), a website browsing program (browser), an operation control program for an image and motion image displaying operation (image viewer, motion image player), an operation control program for a music playing operation (music player), an operation control program for a game, and an operation control program for a voice communication operation. In addition, an operation control program for setting a basic function of the mobile communication terminal 100 (basic setting process), such as "changing a volume of ring alert" or "changing a wall paper of display screen", may be launched and run in accordance with a control command. Each of those programs can be simultaneously run as an independent task.

In the local terminal operation 303, an operation that the mobile communication terminal 100 must execute other than transmission of a control command is registered. For example, in the local terminal operation 303 of the Index 13 that the internal state 301 is "in a state of receiving incoming call", "transfer incoming call" is registered. Moreover, in the local terminal operation 303 of the Index 14 that the internal state 301 is "in a state of reading mail", "transfer mail" is registered.

In the parameter 304, additional information to be added and transmitted together with a control command when the mobile communication terminal 100 transmits the control command, and information contained in a response from the mobile communication terminal 200 are registered. For example, in the parameter 304 of the Index 2 that the internal state 301 is "in a state of Web browsing", "URL" is registered.

In the parameter 304 of the Index 3 that the internal state 301 is "after image pickup", "image size, image data, image attribute information", and the like are registered.

(Registered Device List)

The registered device list 700 is a list of devices with which the mobile communication terminal 100 is permitted to communicate through the proximity wireless communication unit 111. In the registered device list 700, information for identifying a terminal, such as an IP address, a MAC address and a production number, are registered as a list. If a terminal communicationable through the proximity wireless communication unit 111 is registered beforehand in this fashion, it is possible to suppress any false data-exchange with an unintended terminal through a proximity wireless communication.

It is desirable that a new registration of a device and changing of registered information (addition/deletion of a device) should be possible to the registered device list 700 by a user operation through, for example, the operation unit 102, or the sound input unit 105. In addition, device identification information may be transmitted/received through the proximity wireless communication unit 111, and the received information may be registered in the registered device list 700. Furthermore, device identification information of a communication counterparty may be transmitted via an electric mail through the cellular-phone communication unit 101, and may be registered in the registered device list 700. In any cases, registration can be completed through a simple operation, so that the usability can improve.

(Basic Configuration of Reception-Side Terminal)

The basic configuration of the mobile communication terminal 200 of the embodiment is basically same as that of the mobile communication terminal 100 shown in FIG. 2. However, it is not necessary for the mobile communication terminal 200 to have the command table 300 stored in the memory unit 106.

Next, an operation of the mobile communication system 10 will be explained in detail with reference to the flowcharts of FIGS. 4 to 7. Note that the same operation in FIGS. 4 to 7 is denoted by the same reference numeral.

(Process of Mobile Communication Terminal 100)

First, an explanation will be given of an operation of the mobile communication terminal 100 with reference to FIGS. 4, 6, and 7. In a transmission-side process which is shown in FIG. 4 and which is one of the applications (operation control programs) executed by the control unit 112 of the mobile communication terminal 100, as the mobile communication terminal 100 is powered on (step S401: YES), the control unit 112 of the mobile communication terminal 100 initializes individual units of the mobile communication terminal 100. At this time, in the transmission-side process shown in FIG. 4, the control unit 112 of the mobile communication terminal 100 executes an initialization process of the proximity wireless communication unit 111 (step S402).

In this initialization process, necessary voltages are supplied to a transmission circuit of the proximity wireless communication unit 111 and a receiving circuit thereof, a register is set to be an appropriate value, and internal variables of the control software are set to be appropriate values. Thereafter, the proximity wireless communication unit 111 becomes a probe-transmittable state and a waiting state of receiving a probe, and starts a detection process of a communication counterparty device (mobile communication terminal 200).

Thereafter, the mobile communication terminal 100 launches an application in accordance with, for example, a user operation, and executes the application, thereby realizing various functions. The various functions in the embodiment are not limited to any particular ones if general functions that the mobile communication terminal 100 can execute such as call request, creation of a mail, and Web browsing, are possible. Regardless of the state of the mobile communication terminal 100, the control unit 112 of the mobile communication terminal 100 continuously executes the detection process of a communication counterparty device.

The detection process of a communication counterparty device is executed through, for example, following steps.

The control unit 112 of the mobile communication terminal 100 causes the proximity wireless communication unit 111 to transmit a search request 601 (see FIG. 6) (step S403). Accordingly, the search request 601 is transmitted to the proximity wireless communication unit 111 of the mobile communication terminal 200 from the proximity wireless communication unit 111 of the mobile communication terminal 100.

Thereafter, when receiving a search response 602 (see FIG. 6) corresponding to the search request 601, the control unit 112 of the mobile communication terminal 100 determines that the mobile communication terminal 200 (communication counterparty device) is found (step S404: YES). When the mobile communication terminal 200 is not present in a communicationable range of the proximity wireless communication unit 111, no search response 602 is returned, so that the control unit 112 cannot find a communication counterparty device (step S404: NO). In this case, the control unit 112 of the mobile communication terminal 100 determines whether or not a predetermined time (e.g., one second) has elapsed (timeout) (step S405).

When the predetermined time has not elapsed yet (step S405: NO) and while a communication counterparty device is not found (step S404: NO), the process is repeated from the step S404 to the step S405. In this condition, when the predetermined time has elapsed (step S405: YES), the control unit 112 of the mobile communication terminal 100 causes the proximity wireless communication unit 111 to transmit the search request 601 (see FIG. 6) again (step S403). Thereafter, when receiving the search response 602 (see FIG. 6) corresponding to that search request 601, the control unit 112 of the mobile communication terminal 100 determines that the mobile communication terminal 200 (communication counterparty device) is found (step S404: YES).

In this fashion, the control unit 112 of the mobile communication terminal 100 causes the proximity wireless communication unit 111 to transmit the search request 601 (see FIG. 6) (step S403), and waits for receiving the search response 602 which is the response to the request until the predetermined time elapses (repeating step S405, and step S404).

When the mobile communication terminal 200 (communication counterparty device) is present in a communicationable area, the control unit 112 of the mobile communication unit 200 which has received the search request 601 returns the search response 602 to be discussed later unless there is any problem. The control unit 112 of the mobile communication terminal 100 determines that a communication counterparty device is found (step S404: YES) as receiving the search response 602.

When a communicationable counterparty device is found (step S404: YES), the control unit 112 of the mobile communication terminal 100 checks information on the communication counterparty device (step S406). The search request 601 and the search response 602 both contain communication-counterparty-device information on a transmission-originator terminal. Checking of the communication-counterparty-device information is carried out by checking the content of the communication-counterparty-device information contained in the search response 602. Accordingly, it is confirmed that the communication counterparty device is the mobile communication terminal 200.

Next, the control unit 112 of the mobile communication terminal 100 determines whether or not the mobile communication terminal 200 specified by the communication-counterparty-device information is on (i.e., registered in) the registered device list 700 stored in the memory unit 106 beforehand (step S407). When the mobile communication terminal 200 is not on the list (step S407: NO), the control unit 112 of the mobile communication terminal 100 becomes waiting state of finding a communication counterparty device again (repeating the step S403, the step S404 and the step S405). When the mobile communication terminal 200 is on the list, the control unit 112 of the mobile communication terminal 100 determines that the mobile communication terminal 200 which has replied the search response 602 is a registered device (step S407: YES), and acquires an internal state of the mobile communication terminal 100 (local terminal) (step S408).

The internal state is, for example, an execution state of a launched application registered as the internal state 301 in the command table 300, and various variables indicating the internal state are called internal parameters. The control unit 112 of the mobile communication terminal 100 manages the internal state, and holds the internal parameters. Accordingly, as the control unit 112 of the mobile communication terminal 100 reads out the internal parameters, a current internal state of the mobile communication terminal 100 can be acquired.

Subsequently, the control unit 112 of the mobile communication terminal 100 reads out the command table 300 stored in the memory unit 106 (step S409). Next, the control unit 112 of the mobile communication terminal 100 refers to the command table 300 read out in the step S409 and specifies a control command to be transmitted using the internal parameters acquired in the step S408 (step S410). For example, when the internal state indicated by the internal parameters acquired in the step S408 is "in a state of watching terrestrial digital broadcasting program" of Index 1, the control unit 112 of the mobile communication terminal 100 sets a control command to be "launch TV application" of the same Index 1. At this time, the control unit 112 of the mobile communication terminal 100 recognizes that, as additional information to be attached to the control command in the command table 300, a TV kind (terrestrial digital full segment broadcasting, terrestrial digital one segment broadcasting, BS broadcasting, CS broadcasting, IP broadcasting, or the like), a channel (Ch) number, a program name, and the like all in the parameter 304 of the Index 1 are necessary, and acquires those parameters.

When a control command to be transmitted is set, the control unit 112 of the mobile communication terminal 100 transmits a control command 603 (see FIG. 7), to which parameters are added as additional information, to the mobile communication terminal 200 through the proximity wireless communication unit 111 (step S411).

At this time, in order to enable the user to check whether or not an undesirable control command is mistakenly transmitted by incorrect operation, the control unit 112 of the mobile communication terminal 100 may display a message like "command transmitting" or a command kind on the display unit 103, or may cause the sound output unit 104 to output a command name to be transmitted in audio. Accordingly, the usability further improves.

Thereafter, the control unit 112 of the mobile communication terminal 100 determines whether or not a command response (normal response) 604 (see FIG. 6) indicating that the mobile communication terminal 200 successfully received the command is received from the mobile communication terminal 200 (step S412).

When determining that the normal response 604 is not received (step S412: NO), the control unit 112 of the mobile communication terminal 100 determines whether or not a timeout has occurred or a command response (abnormal response) has been received (step S413). When determining that no timeout has occurred or no abnormal response has been received (step S413: NO), the control unit 112 of the mobile communication terminal 100 determines again whether or not a command response (normal response) 604 is received (step S412). When determining that timeout has occurred or a command response (abnormal response) has been received (step S413: YES), the control unit 112 of the mobile communication terminal 100 sends the control command 603 again (step S411). The success rate of transmission/reception of the control command 603 is thus increased in this fashion. Note that the control unit 112 of the mobile communication terminal 100 may progress the process to a next operation (step S414) without waiting a command response 604 in order to simplify the process.

When determining that the normal response 604 is received (step S412: YES), the control unit 112 of the mobile communication terminal 100 executes a predetermined operation in accordance with the local terminal operation 303 in the command table 300 (step S414). When no local terminal operation 303 is set down, the control unit 112 of the mobile communication terminal 100 does not take any action. After completion of the step S414, the process returns to the step S403.

Although the mobile communication terminal 100 transmits the search request 601 to detect a communication counterparty device (mobile communication terminal 200) in the embodiment, the mobile communication terminal 100 may detect a communication counterparty device as receiving a search request from the mobile communication terminal 200.

(Detail of Process at Reception Side)

Next, an explanation will be given of an operation of the mobile communication terminal 200 which is a reception side of the control command with reference to FIGS. 5, 6, and 7.

In a reception-side process which is shown in FIG. 5 and which is one of applications (operation control programs) executed by the control unit 112 of the mobile communication terminal 200, as the mobile communication terminal 200 is powered on (step S501: YES), the control unit 112 of the mobile communication terminal 200 initializes individual units thereof. At this time, in the reception-side process shown in FIG. 5, the control unit 112 of the mobile communication terminal 200 executes an initialization process of the proximity wireless communication unit 111 (step S502).

After the initialization process, the control unit 112 of the mobile communication unit 200 waits until a communication counterparty device (mobile communication terminal 100) is detected by the proximity wireless communication unit 111 of the mobile communication terminal 200 (step S503). As shown in FIG. 6, the control unit 112 of the mobile communication terminal 200 recognizes that the communication counterparty device (mobile communication terminal 100) is present in a communicationable range as receiving a search request 601 from the proximity wireless communication unit 111 of the mobile communication terminal 100.

When recognizing that the communication counterparty device is present in the communicationable range (step S503: YES), the control unit 112 of the mobile communication terminal 200 checks communication-counterparty-device information (step S504). Checking of the communication-counterparty-device information is carried out by checking the content of transmission-originator information contained in the search request 601. Accordingly, the control unit 112 of the mobile communication terminal 200 verifies that the communication counterparty device is the mobile communication terminal 100.

Next, the control unit 112 of the mobile communication terminal 200 determines whether or not the mobile communication terminal 100 specified by the communication-counterparty-device information is on the registered device list 700 stored in the memory unit 106 (step S505). When such a terminal is on the list, the control unit 112 of the mobile communication terminal 200 determines that the mobile communication terminal 100 is a registered device (step S505: YES), and transmits a search response 602 (see FIG. 6) (step S506).

Conversely, when the mobile communication terminal 100 specified by the communication-counterparty-device information is not on the registered device list 700 stored in the memory unit 106 beforehand, the control unit 112 of the mobile communication terminal 200 determines that such a terminal is not a registered device (step S505: NO), and becomes a waiting condition again for finding a communication counterparty device (step S503). Note that when the communication counterparty device is not a registered device (step S505: NO), the control unit 112 of the mobile communication terminal 200 may transmit a search response 602 containing information to the effect that the mobile communication terminal 100 is not on the registered device list 700, and may return the process to the step S503.

After the step S506, the control unit 112 of the mobile communication terminal 200 determines whether or not the mobile communication terminal 200 has received a control command 603 (see FIG. 7) from the mobile communication terminal 100 through the proximity wireless communication unit 111 (step S507).

When determining that no control command 603 has been received (step S507: NO), the control unit 112 of the mobile communication terminal 200 determines whether or not a timeout has occurred (step S508). When determining that no timeout has occurred (step S508: NO), the control unit 112 of the mobile communication terminal 200 determines again whether or not the mobile communication terminal 200 has received a control command 603 (step S507). Conversely, when determining that a timeout has occurred (step S508: YES), the control unit 112 of the mobile communication terminal 200 transmits a search response 602 (see FIG. 6) again (step S506).

When receiving a control command 603 from the mobile communication terminal 100 (step S507: YES), the control unit 112 of the mobile communication terminal 200 checks the content of the received control command 603 (step S509). When it is possible to recognize the content of the received control command 603 without any problem, the control unit 112 of the mobile communication terminal 200 transmits a command response (normal response) 604 indicating that the content of the received control command 603 was successfully recognized to the mobile communication terminal 100 through the proximity wireless communication unit 111 (step S510). Next, the control unit 112 of the mobile communication terminal 200 launches and executes a predetermined application in accordance with the content of the received control command 603, thereby executing a designated operation (step S511). After the step S511, the process returns to the step S503.

At this time, in order to enable the user to check whether or not an undesirable process is mistakenly executed by an incorrect operation, a message like "application automatically launched" or a message indicating from which terminal a launching request is transmitted may be displayed, or the name of an application to be launched may be output as a voice alarm or the like. Accordingly, the usability can further improve.

(Specific Example)

Next, an explanation will be given of further specific examples of the mobile communication system according to the embodiment.

(When being in a State of Watching a Broadcasting Program)

First, an explanation will be given of a case in which a user of the mobile communication terminal 100 is watching a terrestrial digital broadcasting program. In this case, while the user is watching a terrestrial digital broadcasting program using the mobile communication terminal 100, as the mobile communication terminal 200 is moved close to the mobile communication terminal 100 in a communicationable range of the proximity wireless communication unit 111, the control unit 112 of the mobile communication terminal 100 acquires "in a state of watching terrestrial digital broadcasting program" of the internal state 301 of Index 1 in the command table 300 shown in FIG. 3 as an internal state at the mobile communication terminal 100 (step S408 in FIGS. 4 and 7).

Figure 7:
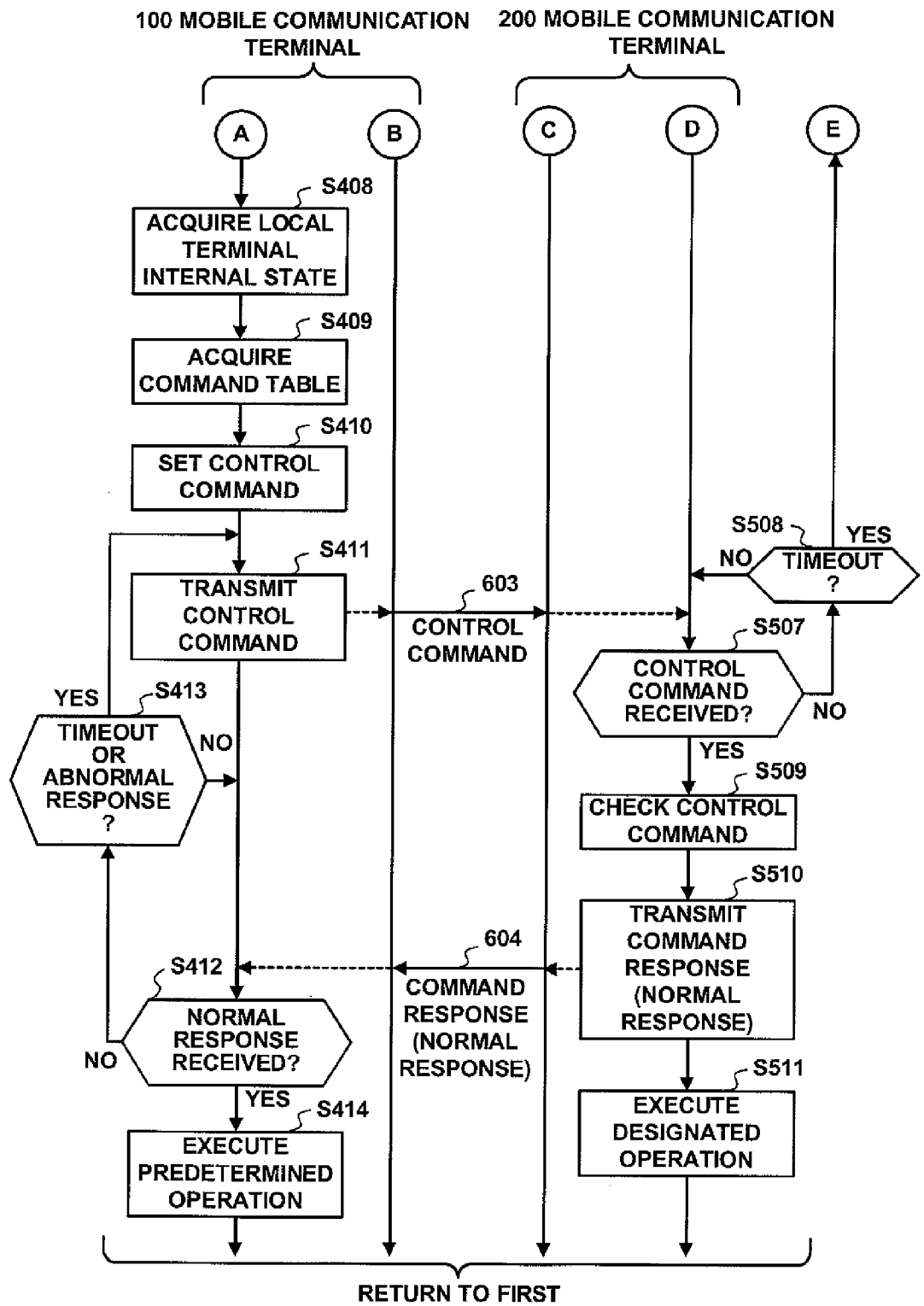
FIG. 7 is a flowchart showing a (second) process of a mobile communication terminal (transmission side) and a mobile communication terminal (reception side) according to the embodiment of the present invention.
Figure 8:
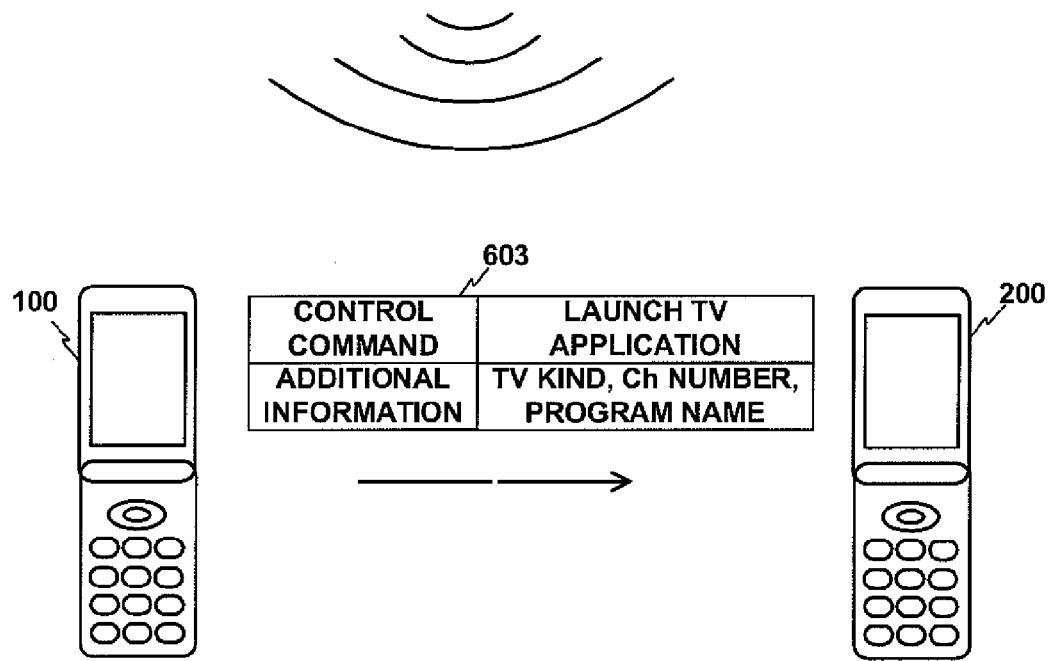
FIG. 8 is a diagram for explaining an operation while a terrestrial digital broadcasting is being watched.

Next, as shown in FIG. 8, a control command 603 which is "launch TV application" is transmitted from the mobile communication terminal 100 to the mobile communication terminal 200, and additional information, such as a TV kind, a channel number, and a program name being currently watched over the mobile communication terminal 100, is also transmitted (step S411 in FIGS. 4 and 7). When receiving such a control command and additional information, the control unit 112 of the mobile communication terminal 200 launches an application for an operation of receiving/playing a TV program in accordance with the received control command 603, controls the terrestrial-digital-broadcasting processing unit 107 to start receiving/playing (designated operation) a designated channel (step S511 in FIGS. 5 and 7).

As explained above, through a simple operation of just moving the mobile communication terminals 100, 200 close to each other, it becomes possible for the user of the mobile communication terminal 200 to watch the same terrestrial digital broadcasting program as the mobile communication terminal 100. This results in significant improvement of the usability of the mobile communication terminal 200.

(When Being in a State of Browsing a Website)

Next, an explanation will be given of a case in which the user of the mobile communication terminal 100 is browsing a website over a network 400 (see FIG. 9) like the Internet through a browser. In this case, as the mobile communication terminal 200 is moved close to the mobile communication terminal 100 in the communicationable range of the proximity wireless communication unit 111, the control unit 112 of the mobile communication terminal 100 acquires "in a state of Web browsing" of the internal state 301 of Index 2 in the command table 300 shown in FIG. 3 as the internal state at the mobile communication terminal 100 (step S408 in FIGS. 4 and 7).

Figure 9:
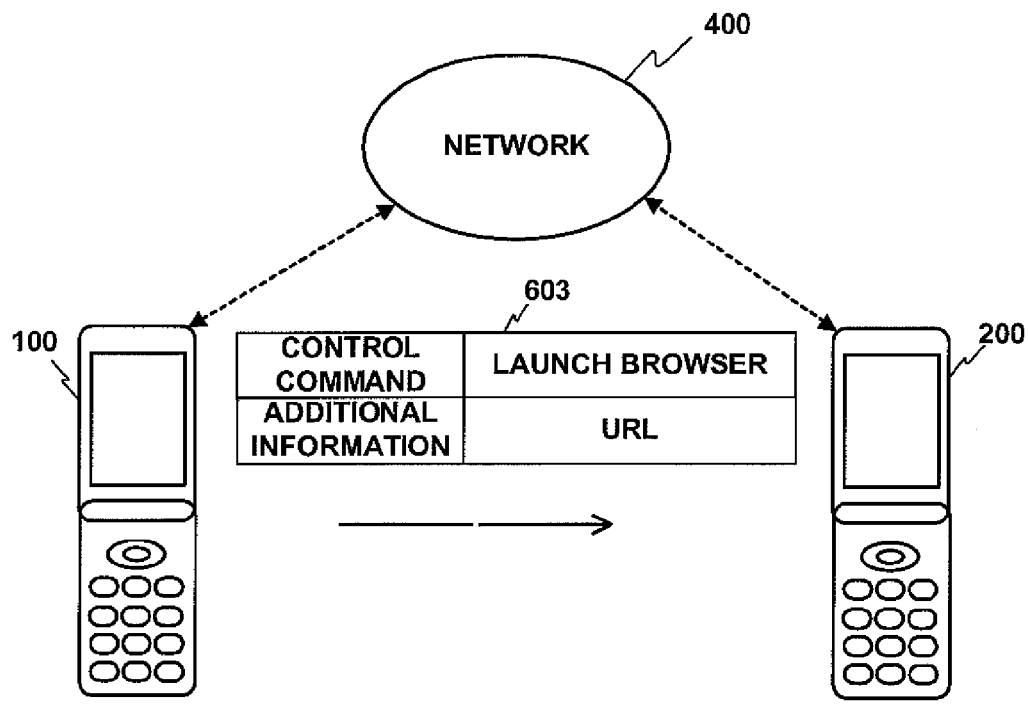
FIG. 9 is a diagram for explaining an operation while a website is being browsed.

Next, for example, as shown in FIG. 9, a control command 603 which is "launch browser" is transmitted from the mobile communication terminal 100 to the mobile communication terminal 200, and additional information like the URL of a website being currently browsed using the mobile communication terminal 100 is also transmitted (step S411 in FIGS. 4 and 7). As receiving such a control command and additional information, the control unit 112 of the mobile communication terminal 200 launches a browser in accordance with the received control command 603, controls the cellular-phone communication unit 101 to access the designated URL, and controls the display unit 103 to display the website (step S511 in FIGS. 5 and 7).

As explained above, through a simple operation of just moving the mobile communication terminals 100, 200 close to each other, the user of the mobile communication terminal 200 can browse the same website as the mobile communication terminal 100. This results in significant improvement of the usability.

(Cases after an Image is Picked Up and after a Motion Image is Picked Up)

Next, an explanation will be given of cases after an image (still image) is picked up and after a motion image is picked up using the camera function of the mobile communication terminal 100. In those cases, as the mobile communication terminal 200 is moved close to the mobile communication terminal 100 in the communicationable range of the proximity wireless communication unit 111 within a predetermined time (e.g., three minutes) after an image or a motion image is picked up, the control unit 112 of the mobile communication terminal 100 acquires "after image pickup" or "after motion image pickup" of the internal state 301 of Index 3 or Index 4 in the command table 300 shown in FIG. 3 as the internal state at the mobile communication terminal 100 (step S408 in FIGS. 4 and 7).

Figure 10:
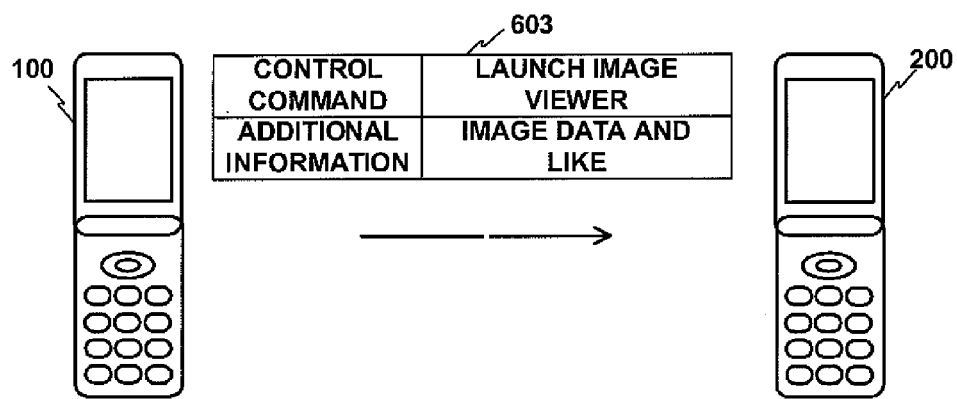
FIG. 10 is a diagram for explaining an operation while a still-image is being displayed after image pickup.
Figure 11:
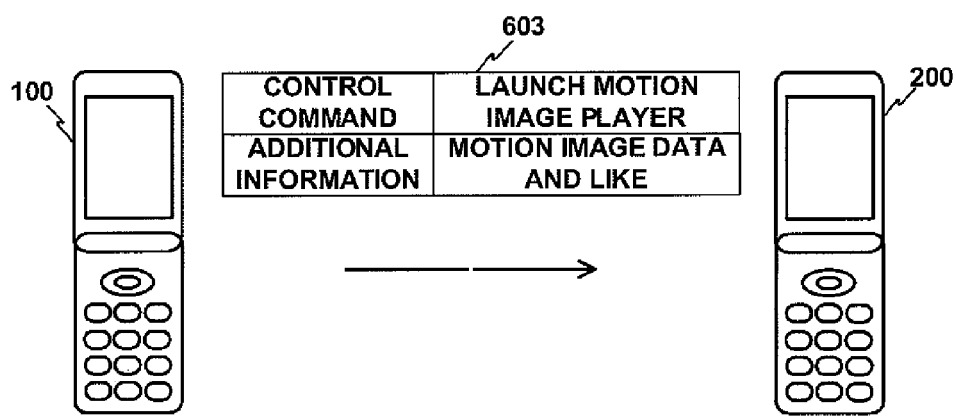
FIG. 11 is a diagram for explaining an operation while a motion image is being played after motion image pickup.

Next, for example, as shown in FIGS. 10 and 11, a control command 603 which is "launch image viewer" or "launch motion image player" is transmitted from the mobile communication terminal 100 to the mobile communication terminal 200, and additional information, such as the size of an image or a motion image picked up right before by the mobile communication terminal 100, data itself (image data or motion image data) and attribute information, are also transmitted (step S411 in FIGS. 4 and 7). As receiving such a control command and additional information, the control unit 112 of the mobile communication terminal 200 launches an image viewer or a motion image player in accordance with the received control command 603, and displays the image data received through the proximity wireless communication unit 111 on the display unit 103 or plays the motion image data (step S511 in FIGS. 5 and 7).

As explained above, through a simple operation of just moving the mobile communication terminals 100, 200 close to each other, the user of the mobile communication terminal 200 can view an image or a motion image picked up by the mobile communication terminal 100. This results in significant improvement of the usability.

Even within a predetermined time after an image or a motion image is picked up, if an application for the camera function of the mobile communication terminal 100 is terminated and the mobile communication terminal 100 returns to a waiting state, no control command 603 may be transmitted in this case.

(When Being in a State of Displaying an Image and in a state of Playing a Motion Image)

Next, an explanation will be given of a case in which the mobile communication terminal 100 is displaying an image or playing a motion image. In those cases, as the mobile communication terminal 200 is moved close to the mobile communication terminal 100 in the communicationable range of the proximity wireless communication unit 111, the control unit 112 of the mobile communication terminal 100 acquires "in a state of displaying image" or "in a state of playing motion image" of the internal state 301 of Index 5 or Index 6 in the command table 300 shown in FIG. 3 as the internal state at the mobile communication terminal 100 (step S408 in FIGS. 4 and 7).

Next, for example, as shown in FIGS. 10 and 11, a control command 603 which is "launch image viewer" or "launch motion image player" is transmitted from the mobile communication terminal 100 to the mobile communication terminal 200, and additional information, such as the size of an image or a motion image picked up right before by the mobile communication terminal 100, data itself (image data or motion image data) and attribute information, are also transmitted (step S411 in FIGS. 4 and 7). As receiving such a control command and additional information, the control unit 112 of the mobile communication terminal 200 launches the image viewer or the motion image player in accordance with the received control command 603, and displays the image data received through the proximity wireless communication unit 111 on the display unit 103 or plays the motion image data (step S511 in FIGS. 5 and 7).

As explained above, through a simple operation of just moving the mobile communication terminals 100, 200 close to each other, the user of the mobile communication terminal 200 can view the same image or the same motion image as being currently displayed on the mobile communication terminal 100 using the mobile communication terminal 200. This results in significant improvement of the usability.

(When Being in a state of Playing Music (DL) and in a state of Playing a Game (DL))

Next, an explanation will be given of a case in which music downloaded from a specific website over the network 400 like the Internet is being played by the mobile communication terminal 100 and of a case in which a game downloaded from a specific website is in progress by the mobile communication terminal 100. In those cases, as the mobile communication terminal 200 is moved close to the mobile communication terminal 100 in the communicationable range of the proximity wireless communication unit 111, the control unit 112 of the mobile communication terminal 100 refers data of that music or data of that game, and when those pieces of data are subjected to copyright management and payment must be made to a management company of the website from which such data is downloaded, the control unit 112 of the mobile communication terminal 100 acquires "in a state of playing music (DL)" or "in a state of playing game (DL)" of the internal state 301 of Index 7 or Index 9 in the command table 300 shown in FIG. 3 as the internal state at the mobile communication terminal 100 (step S408 in FIGS. 4 and 7).

Figure 12:
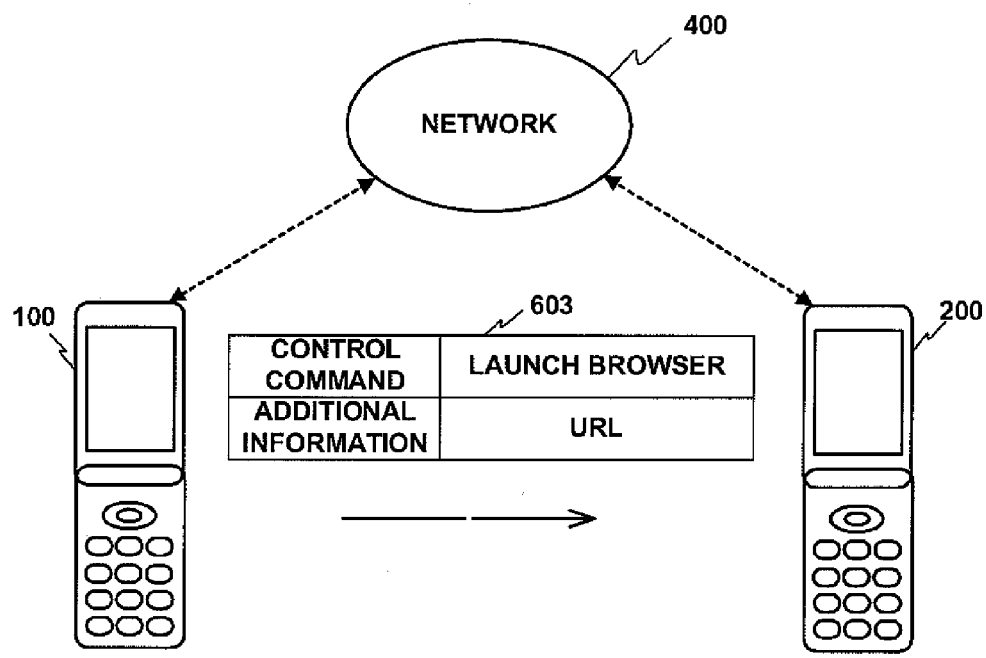
FIG. 12 is a diagram for explaining a (first) operation while music is being played and a game is in progress.

Next, for example, as shown in FIG. 12, a control command 603 which is "launch browser" is transmitted from the mobile communication terminal 100 to the mobile communication terminal 200, and additional information like the URL of the website being browsed by the mobile communication terminal 100 is also transmitted (step S411 in FIGS. 4 and 7). As receiving such a control command and additional information, the control unit 112 of the mobile communication terminal 200 launches the browser in accordance with the received control command 603, controls the cellular-phone communication unit 101 to access the designated URL, and controls the display unit 103 to display the website (step S511 in FIGS. 5 and 7).

As explained above, through a simple operation of just moving the mobile communication terminals 100, 200 close to each other, the mobile communication terminal 200 can display the download site of the music data or the game data being currently played or being progressed at the mobile communication terminal 100, so that bothersome procedures up to purchasing of data can be skipped. This results in significant improvement of the usability.

(When being in a State of Playing Music (Free) or in a State of Playing a Game (Free))

Next, an explanation will be given of a case in which the mobile communication terminal 100 is playing music that is available without any permission under the protection of the copyright law or of a case in which the mobile communication terminal 100 is executing a game that is freely available. In those cases, as the mobile communication terminal 200 is moved close to the mobile communication terminal 100 in the communicationable range of the proximity wireless communication unit 111, the control unit 112 of the mobile communication terminal 100 acquires "in a state of playing music (free)" or "in a state of playing game (free)" of the internal state 301 of Index 8 or Index 10 in the command table 300 shown in FIG. 3 as the internal state at the mobile communication terminal 100 (step S408 in FIGS. 4 and 7).

Figure 13:
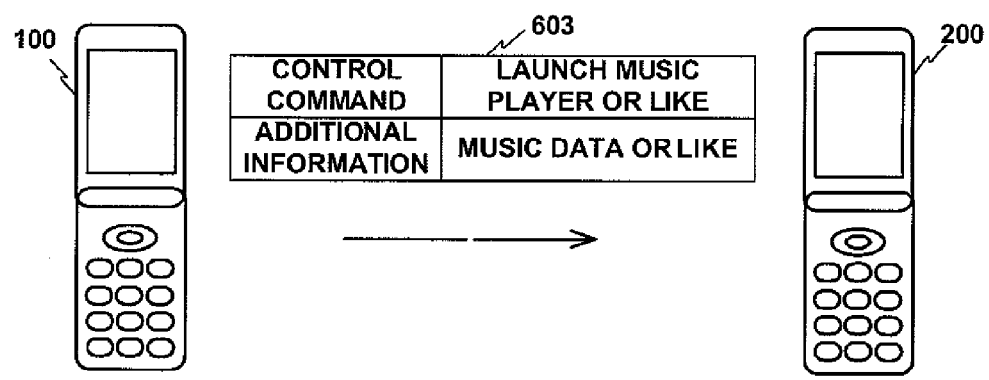
FIG. 13 is a diagram for explaining a (second) operation while music is being played and a game is in progress.

Next, for example, as shown in FIG. 13, a control command 603 which is "launch music player" or "launch game" is transmitted from the mobile communication terminal 100 to the mobile communication terminal 200, and additional information, such as music data being currently played by the mobile communication terminal 100 or game data of a game being currently played is also transmitted (step S411 in FIGS. 4 and 7). As receiving such a control command and additional information, the control unit 112 of the mobile communication terminal 200 launches the music player or the game in accordance with the received control command 603, and plays the music data received through the proximity wireless communication unit 111 or execute the game data (step S511 in FIGS. 5 and 7).

That is, through a simple operation of just moving the mobile communication terminals 100, 200 close to each other, the mobile communication terminal 200 can acquire music data being currently played by the mobile communication terminal 100 or game data of a game being currently played, and the user of the mobile communication terminal 200 can enjoy such music or a game. This results in significant improvement of the usability. As explained above, depending on the copyright management scheme of music data or game data (e.g., when such music or a game is a free software), data can be exchanged directly between the mobile communication terminals 100, 200.

(When being in Basic Settings)

Next, an explanation will be given of a case in which the mobile communication terminal 100 is setting basic internal parameters. In this case, while the user of the mobile communication terminal 100 is setting the basic settings thereof, as the mobile communication terminal 200 is moved close to the mobile communication terminal 100 in a communicationable range of the proximity wireless communication unit 111, the control unit 112 of the mobile communication terminal 100 acquires "in a state of setting basic settings" of the internal state 301 of Index 11 in the command table 300 shown in FIG. 3 as an internal state at the mobile communication terminal 100 (step S408 in FIGS. 4 and 7).

Figure 14:
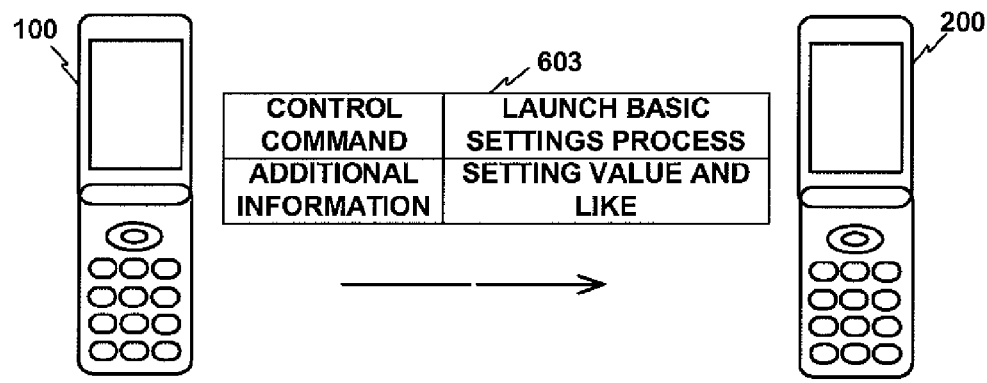
FIG. 14 is a diagram for explaining an operation in a state of setting basic settings.

Next, for example, as shown in FIG. 14, a control command 603 which is "launch basic setting process" is transmitted from the mobile communication terminal 100 to the mobile communication terminal 200, and additional information, such as setting information of the mobile communication terminal 100, a number of settings, a setting item, and a set value, is also transmitted (step S411 in FIGS. 4 and 7). As receiving such a control command and additional information, the control unit 112 of the mobile communication terminal 200 launches an application for a basic setting process in accordance with the received control command 603, and sets the setting information received through the proximity wireless communication unit 111 (step S511 in FIGS. 5 and 7).

As explained above, through a simple operation of just moving the mobile communication terminals 100, 200 close to each other, it becomes possible for the user of the mobile communication terminal 200 to make the settings thereof same as the mobile communication terminal 100. This results in significant improvement of the usability to the user of the mobile communication terminal 100.

(When being in a State of Calling: First Operation)

Figure 15:
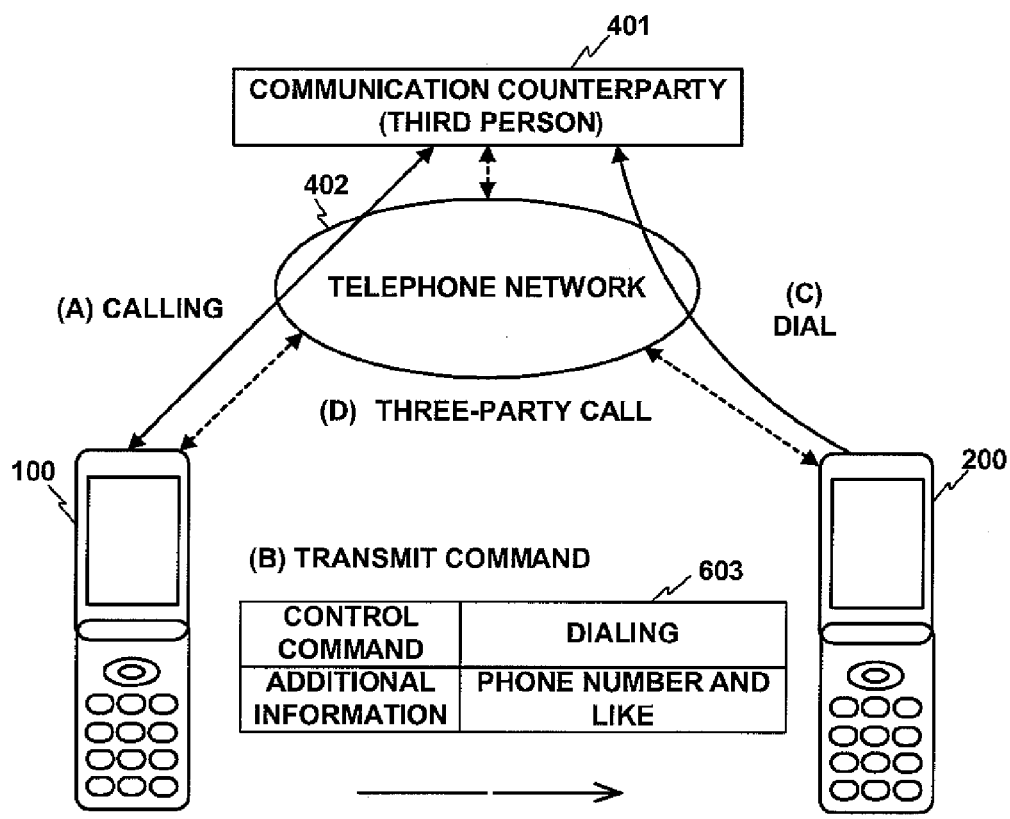
FIG. 15 is a diagram for explaining a (first) operation in a state of calling.

Next, as shown in FIG. 15, an explanation will be given of a case when the user of the mobile communication terminal 100 is calling ((A) in FIG. 15) to a communication counterparty (third person) 401 through a telephone network 402. In this case, as the mobile communication terminal 200 is moved close to the mobile communication terminal 100 in the communicationable range of the proximity wireless communication unit 111, the control unit 112 of the mobile communication terminal 100 acquires "in a state of calling" of the internal state 301 of Index 12 in the command table 300 shown in FIG. 3 as the internal state at the mobile communication terminal 100 (step S408 in FIGS. 4 and 7).

Next, a control command 603 which is "dialing" is transmitted from the mobile communication terminal 100 to the mobile communication terminal 200 ((B) in FIG. 15), and additional information, such as a number of characters, and the phone number of the third person, is also transmitted (step S411 in FIGS. 4 and 7). As receiving such a control command and additional information, the control unit 112 of the mobile communication terminal 200 launches an application for a voice communication operation in accordance with the received control command 603, controls the cellular-phone communication unit 101 to dial the designated phone number through the telephone network 402 ((C) in FIG. 15, step S511 in FIGS. 5 and 7). Accordingly, the telephone call between the user of the mobile communication terminal 100 and the third person is once held, and the user of the mobile communication terminal 200 and the third person become on the line. Thereafter, as the third person executes verification, three-party call ((D) in FIG. 15) among the user of the mobile communication terminal 100, the user of the mobile communication terminal 200, and the third person becomes possible.

As explained above, through a simple operation of just moving the mobile communication terminals 100, 200 close to each other, a calling condition can be changed from a one-on-one call to a third-party call. As a result, the usability significantly improves.

(When Being in a State of Receiving an Incoming Call)

Next, an explanation will be given of a case in which, as shown in FIG. 16, the mobile communication terminal 100 is receiving an incoming call ((A) in FIG. 16) from a communication counterparty (third person) 401. In this case, as the mobile communication terminal 200 is moved close to the mobile communication terminal 100 in the communicationable range of the proximity wireless communication unit 111, the control unit 112 of the mobile communication terminal 100 acquires "in a state of receiving incoming call" of the internal state 301 of Index 13 in the command table 300 shown in FIG. 3 as the internal state at the mobile communication terminal 100 (step S408 in FIGS. 4 and 7).

Next, a control command 603 which is "acquire phone number" is transmitted from the mobile communication terminal 100 to the mobile communication terminal 200 ((B) in FIG. 16, step S411 in FIGS. 4 and 7). As receiving such a control command, the control unit 112 of the mobile communication terminal 200 replies a command response 604 which corresponds to the received control command 603 and to which a number of characters and the phone number of the mobile communication terminal 200 are added to the mobile communication terminal 100 ((C) in FIG. 16, step S510 in FIGS. 5 and 7).

As receiving the command response 604, the mobile communication terminal 100 executes a process of transferring a call when being in a state of receiving an incoming call to the mobile communication terminal 200 in accordance with the phone number ((D) of FIG. 16, step S414 in FIGS. 4 and 7). Accordingly, the incoming call to the mobile communication terminal 100 is transferred to the mobile communication terminal 200. The mobile communication terminal 100 executes a process corresponding to the transferred incoming call (step S511 in FIGS. 5 and 7), and a three-party call among the user of the mobile communication terminal 100, the user of the mobile communication terminal 200, and the third person 401 ((E) in FIG. 16).

As explained above, through a simple operation of just moving the mobile communication terminals 100, 200 close to each other, an incoming call to the mobile communication terminal 100 can be transferred to the mobile communication terminal 200. Accordingly, the usability significantly improves.

(When being in a State of Reading a Mail)

Next, an explanation will be given of a case in which, as shown in FIG. 17, the mobile communication terminal 100 is opening an electronic mail and is reading that mail. In this case, as the mobile communication terminal 200 is moved close to the mobile communication terminal 100 in the communicationable range of the proximity wireless communication unit 111, the control unit 112 of the mobile communication terminal 100 acquires "in a state of reading mail" of the internal state 301 of Index 14 in the command table 300 shown in FIG. 3 as the internal state at the mobile communication terminal 100 (step S408 in FIGS. 4 and 7).

Next, a control command 603 which is "acquire mail address" is transmitted from the mobile communication terminal 100 to the mobile communication terminal 200 ((A) in FIG. 17, step S411 in FIGS. 4 and 7). As receiving such a control command, the control unit 112 of the mobile communication terminal 200 replies a command response 604 which corresponds to the received control command 603 and to which a number of characters and the mail address of the mobile communication terminal 200 are added to the mobile communication terminal 100 ((B) in FIG. 17, step S510 in FIGS. 5 and 7).

As receiving the command response 604, the mobile communication terminal 100 executes a process of transferring a mail being currently read to the mail address of the mobile communication terminal 200 through the network 400 ((C) of FIG. 17, step S414 in FIGS. 4 and 7). Accordingly, the mobile communication terminal 200 receives this mail (step S511 in FIGS. 5 and 7), so that the user of the mobile communication terminal 200 becomes able to read this mail.

As explained above, through a simple operation of just moving the mobile communication terminals 100, 200 close to each other, an electronic mail being currently read on the mobile communication terminal 100 can be transferred to the mobile communication terminal 200. Accordingly, the usability significantly improves.

(When being in a State of Calling: Second Operation)

Transition to a third-party call corresponding to Index 12 in the command table 300 shown in FIG. 3 can also be carried out through the following scheme.

Figure 18:
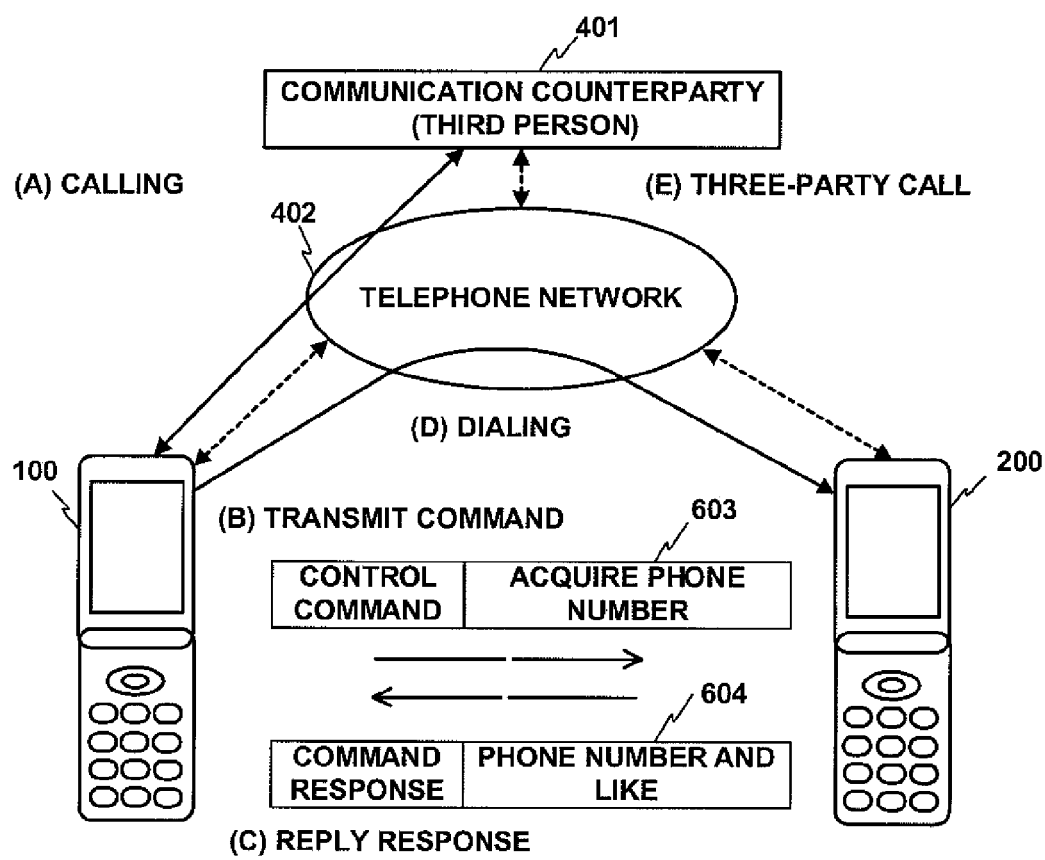
FIG. 18 is a diagram for explaining a (second) operation in a state of calling.

As shown in FIG. 18, while the user of the mobile communication terminal 100 is calling (A) to a communication counterparty (third person) 401 through a telephone network 402, as the mobile communication terminal 200 is moved close to the mobile communication terminal 100 in the communicationable range thereof, as explained above, a control command 603 which is "acquire phone number" is transmitted from the mobile communication terminal 100 ((B) in FIG. 18, step S411 in FIGS. 4 and 7). In this case, as receiving the control command 603, the mobile communication terminal 200 replies the phone number thereof to the mobile communication terminal 100 through the proximity wireless communication unit 111 in accordance with the received control command 603 ((C) in FIG. 18, step S510 in FIGS. 5 and 7).

As receiving the command response 604, the mobile communication terminal 100 controls the cellular-phone communication unit 101 to request a call to the phone number of the mobile communication terminal 200 through the telephone network 402 ((D) in FIG. 18, step S414 in FIGS. 4 and 7). Accordingly, a call between the user of the mobile communication terminal 100 and the third person is once held, and the mobile communication terminal 100 and the mobile communication terminal 200 become on the line. Thereafter, as the mobile communication terminal 100 executes verification, a third-party call ((E) in FIG. 18) among the user of the mobile communication terminal 100, the user of the mobile communication terminal 200, and the third person is realized.

As explained above, through a simple operation of just moving the mobile communication terminals 100, 200 close to each other, a calling condition can be changed from a one-on-one call to a third-party call including the mobile communication terminal 200. As a result, the usability significantly improves.

As explained above, the explanation has been given of the collaborative operation of both mobile communication terminals 100, 200 in a state of watching a terrestrial digital broadcasting program, in a state of Web browsing, in a state of displaying an image or in a state of playing a motion image after the image or the motion image is picked up, in a state of playing a game, in a state of setting basic settings, in a state of calling, in a state of receiving an incoming call, and in a state of reading a mail as specific example cases. In addition, as a recording/shooting button of the mobile communication terminal 100 is pressed, the mobile communication terminal 200 may be also caused to perform recording/shooting.

As is clear from the foregoing explanation, in the embodiment, the terrestrial-digital-broadcasting processing unit 107, the sound decoding unit 109, the video decoding unit 110, the sound output unit 104, the display unit 103, and the control unit 112 work together to function as a broadcast receiving/playing unit. Moreover, the cellular-phone communication unit 101, the sound output unit 104, the sound input unit 105, and the control unit 112 work together to function as a telephone communication unit. Furthermore, the cellular-phone communication unit 101, the display unit 103, and the control unit 112 work together to function as a browser executing unit. Still further, the sound decoding unit 109, the sound output unit 104, and the control unit 112 work together to function as a music playing unit. Yet further, the sound decoding unit 109, the vided decoding unit 110, the display unit 103, the sound output unit 104, and the control unit 112 work together to function as a game executing unit.

The control unit 112 of the mobile communication terminal 100 also functions as a control command generating unit, an operation control unit, and a terminal searching unit.

As explained above, according to the mobile communication terminal 100 of the embodiment, through a simple operation like moving the mobile communication terminals 100, 200 close to each other, a control command to control the mobile communication terminal 200 is transmitted, so that the mobile communication terminal 100 can control the operation of the mobile communication terminal 200. This leads to significant improvement of the usability.

More specifically, according to the embodiment, through a simple operation of just moving the mobile communication terminals 100, 200 close to each other, an application being currently executed by the mobile communication terminal 100 or a related application thereto can be launched and executed by the mobile communication terminal 200. Accordingly, the mobile communication terminals 100, 200 can execute a collaborative operation without causing the user to carry out any user operation to select data to be transmitted or to launch an application. Therefore, the usability significantly improves.

Data necessary for the collaborative operation of both mobile communication terminals 100, 200 are transmitted/received therebetween through the proximity wireless communication unit 111 in the form of additional information added to a control command or of a response to a control command, so that the collaborative operation can be executed smoothly. Those pieces of data may be data used for an application of the mobile communication terminal 100, 200 and data which indicates a transmission originator.

According to the embodiment, in accordance with the internal state of the mobile communication terminal 100, an application of the mobile communication terminal 200 is launched to execute a specific function. However, the present invention is not limited by what specific function is executed and in what specific internal state of the mobile communication terminal 100 the application of the mobile communication terminal 200 is executed. The internal state of the mobile communication terminal 100 may be a launched state of an application that a mobile communication terminal like a cellular phone generally has, and one related to an execution state thereof. The application of the mobile communication terminal 200 subjected to launching may be an application that a mobile communication terminal like a cellular phone generally has.

A control command for cancelling a currently-executed operation may also be transmitted from the mobile communication terminal 100 to the mobile communication terminal 200.

For example, as explained above, once an operation of causing the mobile communication terminal 200 to execute a collaborative operation with the mobile communication terminal 100 is carried out, both terminals are moved apart from each other to disconnect a proximity wireless communication of the proximity wireless communication unit 111, and within a predetermined time (e.g., five minutes), the mobile communication terminal 100 is caused to be in an idle state. In this condition, when the mobile communication terminal 200 is moved close to the mobile communication terminal 100 again, a control command 603 for cancelling a current operation may be transmitted from the mobile communication terminal 100 to the mobile communication terminal 200. This operation can be realized by, for example, adding an index having the internal state 301 as "waiting state" and the control command kind 302 as "cancel" to the command table 300 shown in FIG. 3. This enables cancellation of an operation when a collaborative operation is executed by mistake. As a result, the usability further improves.

Moreover, as explained above, an operation of causing the mobile communication terminal 200 to execute a collaborative operation is carried out, both terminals are moved apart from each other to disconnect a proximity wireless communication by the proximity wireless communication unit 111, and within a predetermined time (e.g., five minutes) the mobile communication terminal 100 is moved close to the mobile communication terminal 200 with the internal state of the mobile communication terminal 100 being maintained as it is. At this time, the mobile communication terminal 100 may transmit a control command for cancelling a current operation to the mobile communication terminal 200. This also enables cancellation of an operation when a collaborative operation is executed by mistake. As a result, the usability further improves.

In the foregoing embodiment, a transmission side (mobile communication terminal 100) and a reception side (mobile communication terminal 200) are clearly defined, and the mobile communication terminal 100 launch an application of the mobile communication terminal 200 and causes it to execute such an application. However, it is possible for both two mobile communication terminals to have the transmission function and the reception function. In this case, applications can be launched in a bidirectional manner, the usability further improves.

When the mobile communication terminal 200 is in any state other than the waiting state, even if the mobile communication terminal 200 receives a control command from the mobile communication terminal 100, the mobile communication terminal 200 may not launch a designated application. This suppresses any launching of an application not desired by the user mistakenly at the mobile communication terminal 200 which is a reception side. This leads to further improvement of the usability.

In the foregoing embodiment, a collaborative operation is executed with a terminal registered in the registered device list 700. However, an address book registered in the memory of a cellular phone device or the like can be used as such a registered device list 700. This enables elimination of bothersome procedures of registering a communication counterparty device in the registered device list 700, so that the usability can further improves.

In mobile communication terminals, a plurality of applications are launched and executed simultaneously in some cases. In this case, control commands corresponding to respective operating states of the applications may be transmitted to another mobile communication terminal, and collaborative operations corresponding to respective applications may be executed by another mobile communication terminal. Alternatively, a control command corresponding to any one of the applications may be transmitted to another mobile communication terminal. The plurality of applications may have a priority order, and a control command corresponding to an application having a higher priority order may be transmitted to another mobile communication terminal.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A mobile communication terminal comprising:
   a proximity wireless communication unit which performs wireless communication directly with another mobile communication terminal present in a communication-able range;

an application unit which runs application software;

an internal parameter holding unit which controls and holds a current internal parameter of a plurality of internal parameters which transits in accordance with a running state of the application software;

a command table which associates and stores the plurality of internal parameters with a plurality of control commands for controlling the another mobile communication terminal;

a control command transmitting unit which obtains from the command table a control command of the plurality of control commands which corresponds to the current internal parameter which is held by the internal parameter holding unit when the proximity wireless communication unit is capable of communicating with the another mobile communication terminal, wherein the control command transmitting unit transmits the control command to the another mobile communication terminal through the proximity wireless communication unit; and an operation control unit which performs operation control in accordance with another control command received from the another mobile communication terminal through the proximity wireless communication unit.

2. The mobile communication terminal according to claim 1, wherein the control command transmitting unit adds additional information on execution of the application software by the application unit to the control command including an instruction to activate specific application software and transmits the control command together with the additional information; and wherein when the another control command received from the another mobile communication terminal through the proximity wireless communication unit includes an instruction to activate specific application software and includes additional information on execution of the specific application software, the operation control unit activates the specific application software in accordance with the instruction and runs the specific application software based on the additional information.

3. The mobile communication terminal according to claim 2, wherein the control command transmitting unit generates, as the additional information, information for specifying a transmission originator of data to be used by the application unit; and wherein when information for specifying the transmission originator of data is included in the additional information included in the another control command received from the another mobile communication terminal through the proximity wireless communication unit, the operation control unit accesses the transmission originator and runs the application software using data received from the transmission originator.

4. The mobile communication terminal according to claim 3, wherein:

when the application unit runs an operation control program of a broadcast receiving and playing operation, the additional information generated by the control command transmitting unit includes information for specifying a broadcasting originator of a program received and played by the application unit;

when the application unit runs a browsing program for accessing a website, the additional information generated by the control command transmitting unit includes information for specifying the website displayed by the application unit;

when the application executing unit runs one of an operation control program of a music playing operation and an operation control program of a game, the additional information generated by the control command transmitting unit includes information for specifying a website from which music data or game data is downloaded;

when the another control command received from the another mobile communication terminal through the proximity wireless communication unit includes an instruction to activate an operation control program of a broadcast receiving and playing operation, and the additional information included in the another control command includes information for specifying a broadcasting originator of a program, the operation control unit receives and plays the program of the broadcasting originator specified by the additional information by activating and running the operation control program of the broadcast receiving and playing operation;

when the another control command received from the another mobile communication terminal through the proximity wireless communication unit includes an instruction to activate a browsing program and the additional information included in the another control command includes information for specifying a website, the operation control unit accesses and displays the website specified by the additional information by activating and running the browsing program; and when the another control command received from the another mobile communication terminal through the proximity wireless communication unit includes an instruction to activate one of an operation control program of a music playing operation and an operation control program of a game and the additional information included in the another control command includes information for specifying a website from which music data or game data is downloaded, the operation control unit accesses a downloading originator specified by the additional information and downloads the music data or game data from the downloading originator by activating and running one of the operation control program of the music playing operation and the operation control program of the game.

5. The mobile communication terminal according to claim 3, wherein the control command transmitting unit generates, as the additional information, data to be used by the application unit, and wherein when the additional information included in the another control command received from the another mobile communication terminal through the proximity wireless communication unit includes data to be used by the application unit, the operation control unit runs the application software based on the data.

6. The mobile communication terminal according to claim 5, wherein when the application unit runs one of an operation control program which picks up a still image or a motion image and an operation control program which displays the still image or the motion image, the additional information included in the control information generated by the control command transmitting unit includes image data of the still image or the motion image;

wherein when the application unit runs a music playing operation control program which plays music, the additional information included in the control information generated by the control command transmitting unit includes the music data;

wherein when the application unit runs a game executing operation control program which executes a game, the additional information included in the control information generated by the control command transmitting unit includes the game data;

wherein when the application unit runs a setting operation control program which sets an internal parameter, the additional information included in the control information generated by the control command transmitting unit includes the internal parameter;

wherein when the application unit runs a telephone communication operation control program which performs telephone communication, the additional information included in the control information generated by the control command transmitting unit includes a phone number of a communication counterparty currently in a state of calling;

wherein when the another control command received from the another mobile communication terminal through the proximity wireless communication unit includes an instruction to activate the operation control program which displays a still image or a motion image and the additional information included in the another control command includes image data of a still image or a motion image, the operation control unit displays the image data included in the additional information by activating and running the operation control program of the displaying operation;

wherein when the another control command received from the another mobile communication terminal through the proximity wireless communication unit includes an instruction to activate the operation control program of the music playing operation and the additional information included in the another control command includes music data, the operation control unit plays music based on the music data included in the additional information by activating and running the operation control program of the music playing operation;

wherein when the another control command received from the another mobile communication terminal through the proximity wireless communication unit includes an instruction to activate the operation control program of the game and the additional information included in the another control program includes game data, the operation control unit runs the operation control program of the game based on the game data included in the additional information by activating and running the operation control program of the game executing operation;

wherein when the another control command received from the another mobile communication terminal through the proximity wireless communication unit includes an instruction to activate the operation control program to set the internal parameter and the additional information included in the another control command includes the internal parameter, the operation control unit sets the current internal parameter; and wherein when the another control command received from the another mobile communication terminal through the proximity wireless communication unit includes an instruction to activate the operation control program of the telephone communication operation and the additional information included in the another control command includes a phone number of a communication counterparty currently in calling, the operation control unit activates the operation control program of the telephone communication operation and dials the phone number included in the additional information.

7. The mobile communication terminal according to claim 1, wherein when the another control command received from the another mobile communication terminal through the proximity wireless communication unit includes a transmission request of information for specifying the mobile communication terminal, the operation control unit replies with a response including information for specifying the mobile communication terminal to the another mobile communication terminal through the proximity wireless communication unit; and wherein when the application unit receives a response from the another mobile communication terminal through the proximity wireless communication which includes information for specifying the another mobile communication terminal terminal, the application unit runs the application software based on the information for specifying the another mobile communication terminal included in the response.

8. The mobile communication terminal according to claim 7, wherein the application unit runs an operation control program of a telephone communication operation which performs telephone communication and the current internal parameter indicates currently in calling or in receiving, wherein the control command transmitting unit transmits the control command including a notification request of a phone number;

wherein when the another control command including a notification request of a phone number is received from the another mobile communication terminal through the proximity wireless communication unit, the operation control unit replies with a response including the telephone number of the mobile communication terminal to the another mobile communication terminal through the proximity wireless communication unit; and wherein when the application unit receives a response including a telephone number of the another mobile communication terminal from the another mobile communication terminal through the proximity wireless communication unit, the application unit dials the telephone number of the another mobile communication terminal included in the response.

9. The mobile communication terminal according to claim 7, wherein when the application unit executes an electronic mail executing program which transmits/receives an electronic mail and the current internal parameter indicates opening of an electronic mail, the control command transmitting unit transmits the control command including a notification request of a mail address;

wherein when the another control command including a notification request of a mail address is received from the another mobile communication terminal through the proximity wireless communication unit, the operation control unit replies with a response including the mail address of the mobile communication terminal to the another mobile communication terminal through the proximity wireless communication unit; and wherein when the application unit receives a response including a mail address of the another mobile communication terminal from the another mobile communication terminal through the proximity wireless communication unit, the application unit transmits the electronic mail being currently opened to the mail address of the another mobile communication terminal included in the response.

10. The mobile communication terminal according to claim 1, wherein when the internal parameter indicates an idling state, the control command transmitting unit generates the control command for cancelling another control command transmitted previously to the another mobile communication terminal to which the another control command was already transmitted through the proximity wireless communication unit, and transmits the control command to the another mobile communication terminal; and wherein when the control command received from the another mobile communication terminal through the proximity wireless communication unit includes a cancelling instruction of the control command received previously, the operation control unit cancels a running operation in accordance with the control command.

11. The mobile communication terminal according to claim 1, wherein when a communication through the proximity wireless communication unit is once disconnected and becomes communicationable again, the control command transmitting unit generates the control command for cancelling a previous control command transmitted previously and transmits the control command to the another mobile communication terminal; and wherein when the another control command received from the another mobile communication terminal through the proximity wireless communication unit includes a cancelling instruction of another previous control command received previously, the operation control unit cancels a running operation in accordance with the another control command.

12. The mobile communication terminal according to claim 1, further comprising a determination unit which searches the another mobile communication terminal through the proximity wireless communication unit and which determines whether the searched another mobile communication terminal is registered on a registration list, wherein the control command transmitting unit transmits the control command only to the searched another mobile communication terminal that is determined to be a registered terminal on the registration list by the determination unit, and wherein the operation control unit controls an operation in accordance only with the another control command received from the another mobile communication terminal determined to be registered on the registration list by the determination unit.

13. The mobile communication terminal according to claim 7, wherein the application unit runs a telephone communication program of a telephone communication operation or an electronic mail executing program, and the information for specifying the mobile communication terminal is a phone number or a mail address.

14. A mobile communication system comprising:
a plurality of the mobile communication terminals according to claim 1.

15. A mobile communication method which is executed by a mobile communication terminal including a proximity wireless communication unit, an application unit, an internal parameter holding unit, a control command transmitting unit, and a command table which associates and stores a plurality of internal parameters with a plurality of control commands for controlling another mobile communication terminal, the method comprising:

a proximity wireless communication step of causing the proximity wireless communication unit to perform wireless communication directly with the another mobile communication terminal present in a communicationable range;

an application running step of causing the application unit to run application software;

an internal parameter holding step of causing the internal parameter holding unit to control and hold a current internal parameter of the plurality of internal parameters which transits in accordance with a running state of the application software; and a control command transmitting step of causing the control command transmitting unit to obtain from the command table a control command which corresponds to the current internal parameter which is held by the internal parameter holding unit when the proximity wireless communication unit is capable of communicating with the another mobile communication terminal and of causing the control command transmitting unit to transmit the control command to the another mobile communication terminal through the proximity wireless communication unit.

16. A non-transitory recording medium storing a program which when executed by a computer causes the computer to function as:

a proximity wireless communication unit which performs wireless communication directly with another mobile communication terminal present in a communicationable range;

an application unit which runs application software;

an internal parameter holding unit which controls and holds a current internal parameter of a plurality of internal parameters which transits in accordance with a running state of the application software; and a control command transmitting unit which obtains a control command corresponding to a current internal parameter which is held by the internal parameter holding unit from a command table which associates and stores the plurality of internal parameters with a plurality of control commands for controlling the another mobile communication terminal, and the control command transmitting unit transmits the control command to the another mobile communication terminal through the proximity wireless communication unit when the proximity wireless communication unit is capable of communicating with the another mobile communication terminal.

* * * * *